United States Patent
Jung et al.

(10) Patent No.: US 11,474,735 B2
(45) Date of Patent: Oct. 18, 2022

(54) OPERATION METHOD OF STORAGE DEVICE, AND OPERATION METHOD OF STORAGE SYSTEM INCLUDING HOST DEVICE AND STORAGE DEVICE

(71) Applicant: Samsung Electronics Co., Ltd., Suwon-si (KR)

(72) Inventors: Sangwon Jung, Busan (KR); Jinsoo Yoo, Hwaseong-si (KR); Hyeongyu Cho, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 152 days.

(21) Appl. No.: 16/943,000

(22) Filed: Jul. 30, 2020

(65) Prior Publication Data
US 2021/0034280 A1 Feb. 4, 2021

(30) Foreign Application Priority Data
Aug. 2, 2019 (KR) .......................... 10-2019-0094235

(51) Int. Cl.
| | |
|---|---|
| *G06F 3/06* | (2006.01) |
| *G06F 5/06* | (2006.01) |
| *G06F 11/16* | (2006.01) |
| *G06F 12/02* | (2006.01) |
| *G06F 13/22* | (2006.01) |

(Continued)

(52) U.S. Cl.
CPC ............ *G06F 3/0653* (2013.01); *G06F 3/064* (2013.01); *G06F 3/0613* (2013.01); *G06F 3/0659* (2013.01); *G06F 3/0673* (2013.01); *G06F 5/06* (2013.01); *G06F 11/1658* (2013.01); *G06F 13/38* (2013.01); *H04L 12/4013* (2013.01); *H04L 47/10* (2013.01); *H04L 47/25* (2013.01); *H04L 47/41* (2013.01)

(58) Field of Classification Search
None
See application file for complete search history.

(56) References Cited

U.S. PATENT DOCUMENTS

| | | | |
|---|---|---|---|
| 7,137,019 B2 | 11/2006 | Hellerstein et al. | |
| 8,850,153 B2 * | 9/2014 | Tressler | G06F 3/0679 |
| | | | 711/E12.008 |

(Continued)

*Primary Examiner* — Idriss N Alrobaye
*Assistant Examiner* — Dayton Lewis-Taylor
(74) *Attorney, Agent, or Firm* — Muir Patent Law, PLLC

(57) ABSTRACT

An operation method of a storage device configured to communicate with an external device through an interface channel includes receiving an indicator of a first throttling level of a plurality of throttling levels from the external device, setting a first operation parameter based on a throttling predefined table (PDT) including a relationship between the plurality of throttling levels and a plurality of throttling performances, such that the interface channel has a first throttling performance from among the plurality of throttling performances, the first throttling performance corresponding to the first throttling level, receiving a first input/output (I/O) request from the external device through the interface channel having the first throttling performance caused by the setting of the first operation parameter, and processing a first operation corresponding to the first I/O request through the interface channel having the first throttling performance.

19 Claims, 22 Drawing Sheets

(51) Int. Cl.

| | | |
|---|---|---|
| *G06F 13/38* | (2006.01) | |
| *H04L 12/40* | (2006.01) | |
| *H04L 47/10* | (2022.01) | |
| *H04L 47/25* | (2022.01) | |
| *H04L 47/41* | (2022.01) | |

(56) References Cited

U.S. PATENT DOCUMENTS

| | | |
|---|---|---|
| 9,367,250 B2 | 6/2016 | Tressler et al. |
| 9,436,628 B2 | 9/2016 | Vaishampayan et al. |
| 9,760,392 B1 | 9/2017 | Dantkale et al. |
| 10,007,311 B2 | 6/2018 | Raghu et al. |
| 10,025,522 B2 | 7/2018 | Helmick |
| 10,055,144 B1* | 8/2018 | Panchapakesan ........ G06F 3/064 |
| 2013/0238837 A1* | 9/2013 | Sawaoka ............... G06F 3/0613 |
| | | 711/103 |
| 2019/0018611 A1 | 1/2019 | Kim |
| 2019/0114276 A1* | 4/2019 | Hodes ................. G06F 13/4027 |
| 2020/0218325 A1* | 7/2020 | Patel ........................ G06F 1/28 |

\* cited by examiner

FIG. 5A

1211
[PDT]

| Throttling Level | Fluctuaion | Performance |
|---|---|---|
| THLV_0 | FL_0 | Perf_0 |
| THLV_1 | FL_1 | Perf_1 |
| THLV_2 | FL_2 | Perf_2 |
| THLV_3 | FL_3 | Perf_3 |
| ⋮ | ⋮ | ⋮ |
| THLV_n | FL_n | Perf_n |

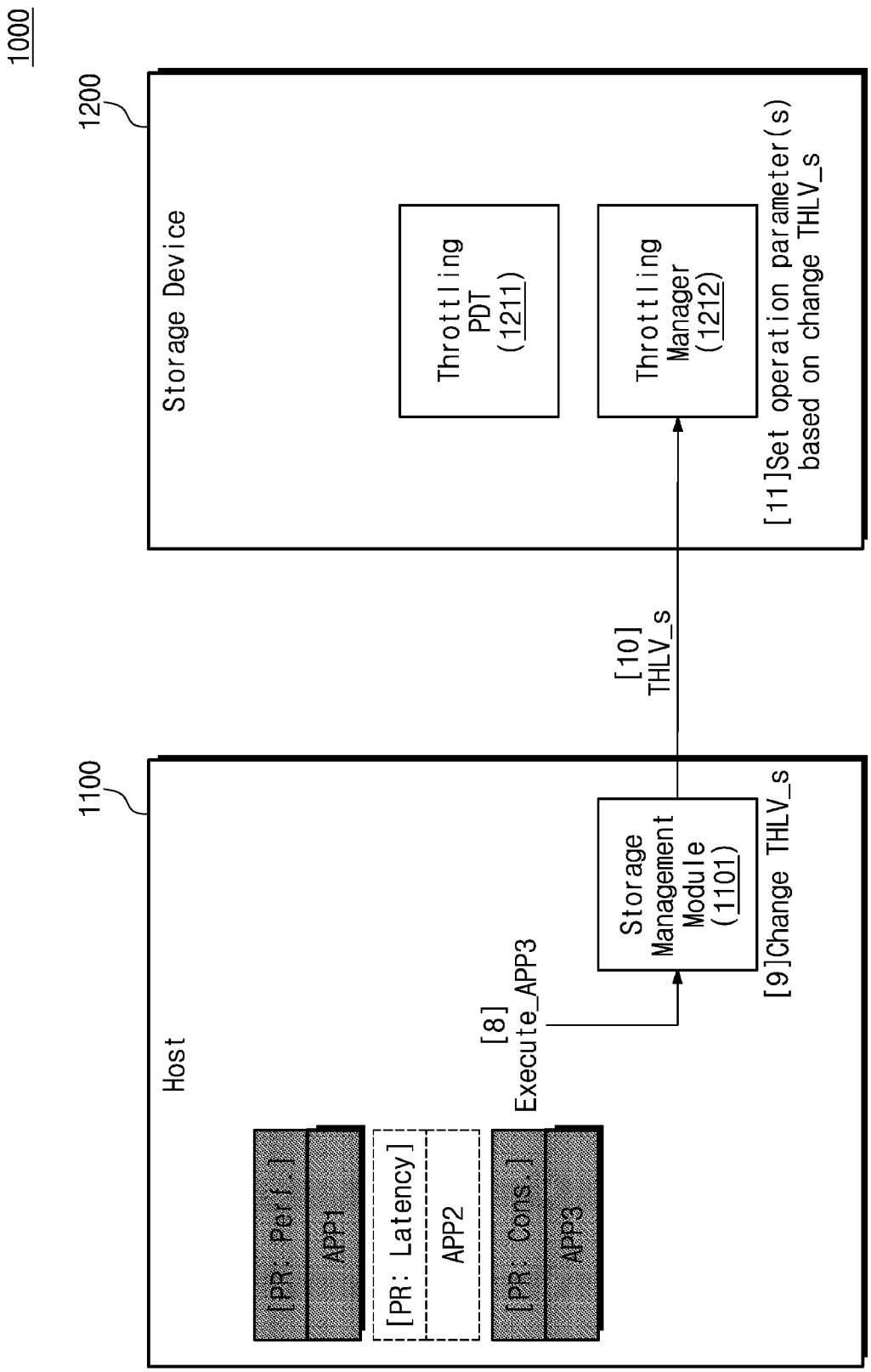

FIG. 11

2217
[Internal Policy]

| State | Throttling Level |
|---|---|
| ST_0: WR/100% | THLV_0 |
| ST_1: WR/50% | THLV_1 |
| ST_2: WR/10% | THLV_2 |
| ST_3: RD/100% | THLV_3 |

OPERATION METHOD OF STORAGE DEVICE, AND OPERATION METHOD OF STORAGE SYSTEM INCLUDING HOST DEVICE AND STORAGE DEVICE

CROSS-REFERENCE TO RELATED APPLICATIONS

This application claims priority under 35 U.S.C. § 119 to Korean Patent Application No. 10-2019-0094235 filed on Aug. 2, 2019, in the Korean Intellectual Property Office, the disclosure of which is incorporated by reference herein in its entirety.

BACKGROUND

Embodiments of the inventive concept described herein relate to a semiconductor memory, and more particularly, relate to an operation method of a storage device, and an operation method of a storage system including a host device and the storage device.

Semiconductor memory devices are classified as volatile memory devices, in which stored data disappear when a power is turned off, such as a static random access memory (SRAM) or a dynamic random access memory (DRAM), or a nonvolatile memory device, in which stored data are retained even when a power is turned off, such as a flash memory device, a phase-change RAM (PRAM), a magnetic RAM (MRAM), a resistive RAM (RRAM), or a ferroelectric RAM (FRAM).

Flash memory devices are being widely used as a high-capacity storage medium of a computing system. Various management operations for managing a flash memory-based high-capacity storage medium are performed in the storage medium due to a physical characteristic (e.g., write after erase) of the flash memory. The performance of the flash memory-based high-capacity storage medium may change due to the management operations.

SUMMARY

Embodiments of the inventive concept provide an operation method of a storage device capable of providing improved performance by performing a throttling operation based on a throttling level corresponding to a request of a host device from among a plurality of throttling levels, and an operation method of a storage system including the host device and the storage device.

According to an example embodiment, an operation method of a storage device configured to communicate with an external device through an interface channel includes receiving an indicator of a first throttling level of a plurality of throttling levels from the external device, setting a first operation parameter based on a throttling predefined table (PDT) including a relationship between the plurality of throttling levels and a plurality of throttling performances, such that the interface channel has a first throttling performance from among the plurality of throttling performances, the first throttling performance corresponding to the first throttling level, receiving a first input/output (I/O) request from the external device through the interface channel having the first throttling performance caused by the setting of the first operation parameter, and processing a first operation corresponding to the first I/O request through the interface channel having the first throttling performance.

According to an example embodiment, an operation method of a storage device configured to communicate with an external device through an interface channel includes receiving an indicator of an external throttling level from the external device, determining an internal throttling level from among a plurality of internal throttling levels, the internal throttling level corresponding to a current state of the storage device, based on an internal policy including a relationship between a plurality of states of the storage device and the plurality of internal throttling levels, determining a final throttling level based on the external throttling level and the internal throttling level, setting an operation parameter based on a throttling predefined table (PDT) including a relationship between the plurality of throttling levels and a plurality of throttling performances, such that the interface channel has a throttling performance from among the plurality of throttling performances, the throttling performance corresponding to the final throttling level, receiving a first input/output (I/O) request from the external device through the interface channel having the throttling performance caused by the setting of the operation parameter, and processing a first operation corresponding to the first I/O request through the interface channel having the throttling performance.

According to an example embodiment, an operation method of a storage system including a host device and a storage device communicating with the host device through an interface channel includes executing, by the host device, a first application having a first priority, selecting, by the host device, a first throttling level corresponding to the first priority based on a throttling predefined table (PDT), transferring, by the host device, an indicator of the first throttling level to the storage device, setting, by the storage device, a first operation parameter based on the throttling PDT such that the interface channel has a first throttling performance corresponding to the first throttling level, transferring, by the host device, a first input/output (I/O) request generated by the first application to the storage device through the interface channel having the first throttling performance caused by the setting of the first operation parameter, and processing, by the storage device, a first operation corresponding to the first I/O request through the interface channel having the first throttling performance.

BRIEF DESCRIPTION OF THE FIGURES

The above and other objects and features of the inventive concept will become apparent by describing in detail example embodiments thereof with reference to the accompanying drawings.

FIGS. 5A and 5B are diagrams for describing an operation of a storage device for each of a plurality of throttling levels according to example embodiments.

FIGS. 7A to 7D are diagrams for describing an operation according to the flowchart of FIG. 6 according to example embodiments.

FIG. 11 is a diagram for describing an operation of an internal policy of FIG. 10 according to example embodiments.

DETAILED DESCRIPTION

Below, embodiments of the inventive concept may be described in detail and clearly to such an extent that an ordinary one in the art easily implements the inventive concept.

The terms "unit", "module", etc. to be used in the specification may be implemented in the form of hardware, software, or a combination thereof configured to perform various functions to be described in the specification.

Figure 1:
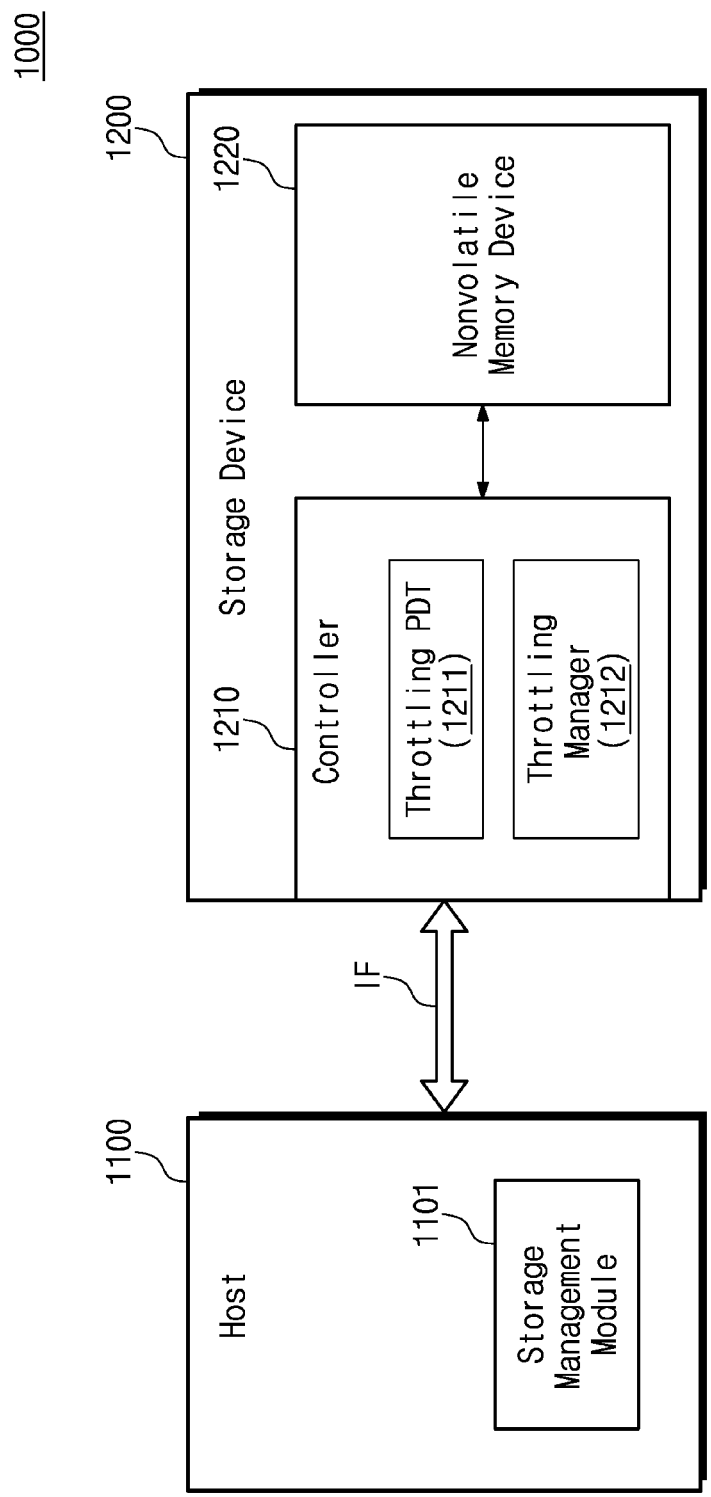
FIG. 1 is a block diagram illustrating a storage system according to an embodiment of the inventive concept.

FIG. 1 is a block diagram illustrating a storage system according to an embodiment of the inventive concept. Referring to FIG. 1, a storage system 1000 may include a host 1100 and a storage device 1200. In an example embodiment, the storage system 1000 may be a computing system, which is configured to process various information, such as a personal computer (PC), a notebook, a laptop, a server, a workstation, a tablet PC, and a smartphone.

The host 1100 may be configured to control overall operations of the storage system 1000. The storage device 1200 may be used as a high-capacity storage medium of the storage system 1000. In an example embodiment, the storage device 1200 may be a solid state drive (SSD) mounted on the host 1100. Alternatively, the storage device 1200 may be an embedded memory card that is integrated in the host 1100 or a memory card that is removable from the host 1100.

The storage device 1200 may include a controller 1210 and a nonvolatile memory device 1220. In response to a request of the host 1100, the controller 1210 may store data in the nonvolatile memory device 1220 or may read data stored in the nonvolatile memory device 1220.

Under control of the controller 1210, the nonvolatile memory device 1220 may store data or may provide data stored therein to the controller 1210. In an example embodiment, the nonvolatile memory device 1220 may be a NAND flash memory device, but the inventive concept is not limited thereto.

In an example embodiment, the host 1100 and the storage device 1200 may exchange data through an interface channel IF. For example, through the interface channel IF, the host 1100 may transfer data to the storage device 1200 or may receive data from the storage device 1200. In an example embodiment, a transfer speed of data through the interface channel IF (or the size of data exchanged per unit time) may be used as a performance factor of the storage device 1200.

Below, for convenience of description, the term "performance of the storage device 1200" is used. Unless defined differently, the performance of the storage device 1200 may mean a data transfer speed or the amount of data exchanged between the storage device 1200 and the host 1100 per unit time or. The performance of the storage device 1200 may be expressed by using various indices such as a random read, a random write, a sequential write, and a sequential read.

In an example embodiment, under a particular situation or a particular condition, the performance of the storage device 1200 may not be maintained uniformly. For example, a write time during which an operation corresponding to the same write request is completed may vary depending on a physical characteristic or various environment variables (e.g., the size of a buffer memory and an available memory capacity in a nonvolatile memory device) of the nonvolatile memory device 1220. This difference of write time may cause performance fluctuations of the storage device 1200. For example, the performance fluctuations may occur in the storage device 1200 depending on various environment variables.

The storage device 1200 may perform a throttling operation for the purpose of providing a uniform performance. The throttling operation indicates an operation maintaining the performance of the storage device 1200 uniformly by adjusting various operation parameters in the storage device 1200. In an example embodiment, various parameters may indicate various parameters for components, which are associated with the performance of the storage device 1200 (i.e., a speed of an I/O exchanged through the interface channel IF), such as a buffer memory, a command queue, and a host interface. The storage device 1200 may perform the throttling operation for providing a uniform performance by controlling the various parameters described above.

In an example embodiment, because a conventional storage device performs the throttling operation depending on a given condition, the conventional storage device fails to provide an optimum performance with regard to various functions that are implemented at the host 1100.

The storage device 1200 according to an embodiment of the inventive concept may perform the throttling operation based on a throttling level from among a plurality of throttling levels, corresponding to a request of the host 1100. In this case, the storage device 1200 may provide a performance optimized for the request of the host 1100. In addition, because the storage device 1200 performs the throttling operation based on one of the plurality of throttling levels, the storage device 1200 may provide optimized performance fluctuations with respect to various conditions.

For example, the host 1100 may include a storage management module 1101. The storage management module 1101 may be configured to manage or control the performance of the storage device 1200. In an example embodiment, the storage management module 1101 may be a program or a device driver that is provided in the form of software from a manufacturer of the storage device 1200. The storage management module 1101 may be driven by a processor of the host 1100.

The storage management module 1101 may receive a throttling predefined table (PDT) 1211 from the controller 1210 under a particular operating condition of the host 1100. In an example embodiment, the particular operating condition of the host 1100 may include various conditions such as an initialization operation, execution of a particular application, or occurrence of throttling requirement. The throttling PDT 1211 may include information about a performance fluctuation level and a target performance for each of a plurality of throttling levels.

The storage management module 1101 may select a throttling level, which corresponds to a currently required optimum performance, from among the plurality of throttling levels based on the throttling PDT 1211. The storage management module 1101 may transfer information about the selected throttling level to the storage device 1200.

The controller 1210 of the storage device 1200 may further include a throttling manager 1212. The throttling manager 1212 may set various operation parameters of the storage device 1200 based on a throttling level received from the storage management module 1101 of the host 1100. Afterwards, the storage device 1200 may communicate with the host 1100 through the interface channel IF based on the set operation parameters. In this case, the storage device 1200 may support a performance corresponding to a throttling level determined by the storage management module 1101 of the host 1100.

As described above, the storage device 1200 according to an embodiment of the inventive concept may communicate with the host 1100 based on a throttling level from among the plurality of throttling levels, corresponding to a request of the host 1100. Accordingly, the storage device 1200 with improved performance and improved reliability is improved. An operation method of the host 1100 and the storage device 1200 according to an embodiment of the inventive concept will be more fully described with reference to drawings below.

Figure 2:
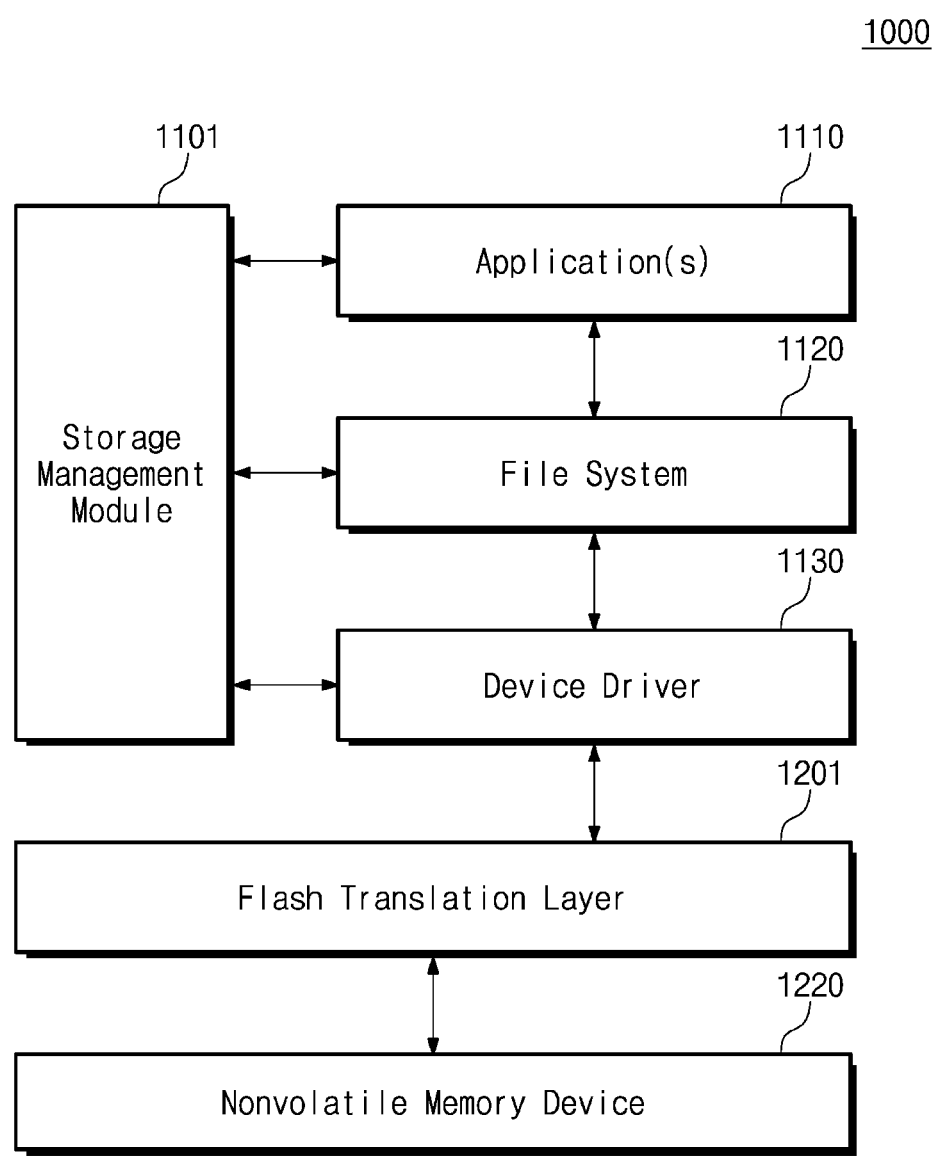
FIG. 2 is a block diagram illustrating software layers of the storage system of FIG. 1 according to example embodiments.

FIG. 2 is a block diagram illustrating software layers of the storage system of FIG. 1 according to example embodiments. The block diagram of FIG. 2 shows the software layers of the storage system 1000, and the inventive concept is not limited thereto. For example, all or a part of components illustrated in FIG. 2 may be implemented in the form of software, hardware, or a combination thereof.

Referring to FIGS. 1 and 2, the software layers of the storage system 1000 may include the storage management module 1101, an application 1110, a file system 1120, a device driver 1130, and a flash translation layer 1201. In an example embodiment, the storage management module 1101, the application 1110, the file system 1120, and the device driver 1130 may be included in the host 1100 or may be executed by any other component(s) (e.g., a processor) included in the host 1100.

The application 1110 may include various application programs that are driven on the host 1100. The file system 1120 may organize files or data that are used by the application 1110. For example, the file system 1120 may manage a storage space of the storage device 1200 by using logical addresses. In an example embodiment, the file system 1120 may have a type that is variable with an operating system driven on the host 1100. For example, the file system 1120 may include one of various file systems such as FAT (File Allocation Table), FAT32, NTFS (NT File System), HFS (Hierarchical File System), JSF2 (Journaled File System2), XFS, ODS-5 (On-Disk Structure-5), UDF, ZFS, UFS (Unix File System), ext2, ext3, ext4, ReiserFS, Reiser4, ISO 9660, Gnome VFS, BFS, and WinFS.

The device driver 1130 may perform an operation of translating information managed by the file system 1120 into information that is recognizable by the storage device 1200.

The storage management module 1101 may be configured to manage information of the application 1110, the file system 1120, and the device driver 1130. For example, the storage management module 1101 may manage attribute information about the application 1110 that is executed on the host 1100. The storage management module 1101 may manage logical addresses that are managed by the file system 1120 depending on various conditions (e.g., a storage capacity and an overprovisioning capacity) of the storage device 1200. The storage management module 1101 may be configured to manage the device driver 1130 depending on a type of the interface channel IF between the host 1100 and the storage device 1200.

The flash translation layer 1201 may be driven on the controller 1210 of the storage device 1200. The flash translation layer 1201 may be configured to map a logical address managed by the file system 1120 of the host 1100 onto a physical address of the nonvolatile memory device 1220 and to manage mapping information. The flash translation layer 1201 may be configured to perform various operations of the nonvolatile memory device 1220, for example, a garbage collection operation, a wear-leveling operation, a bad block replacing operation, an area mapping operation, and a mapping table managing operation.

Figure 3:
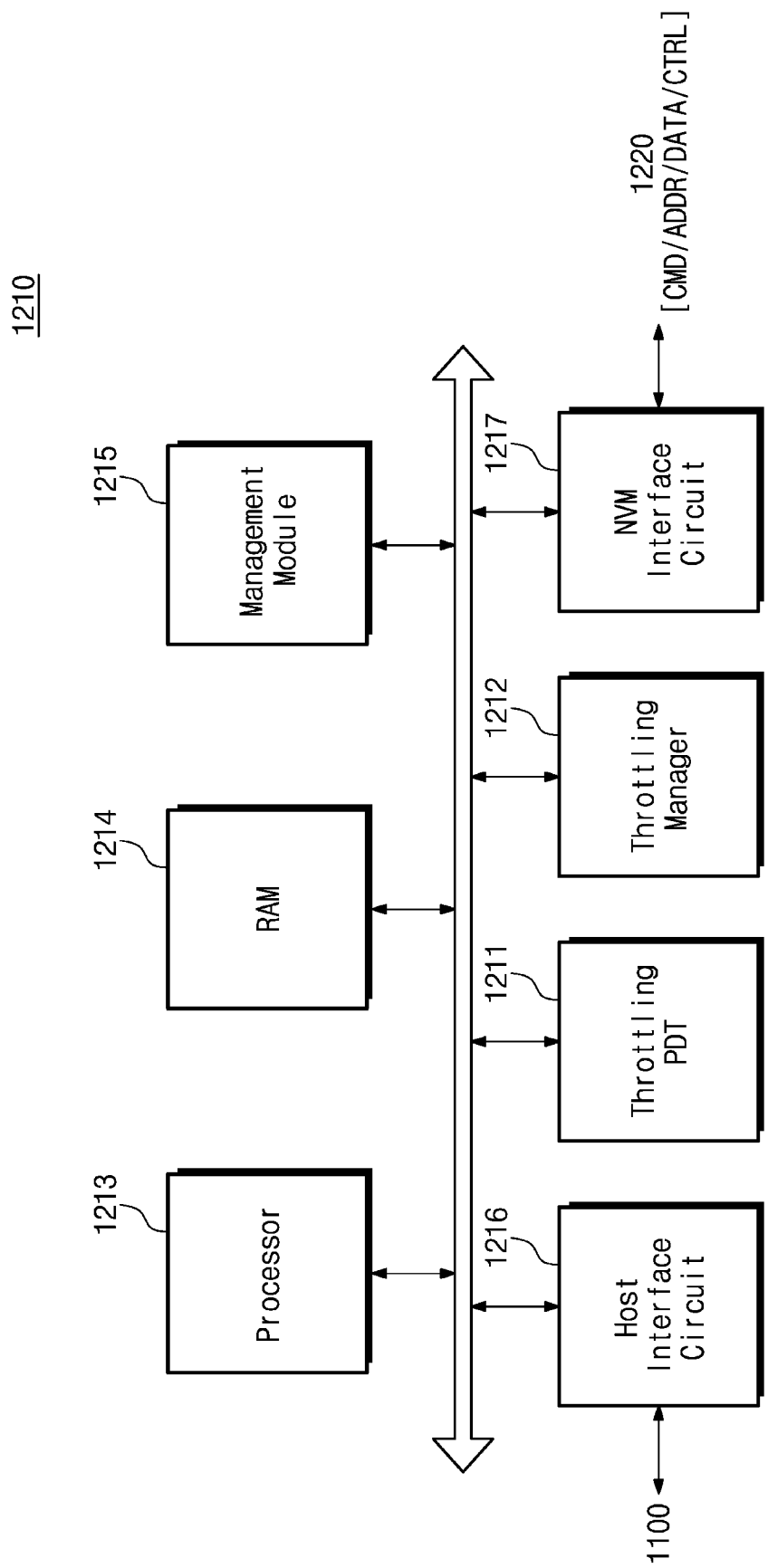
FIG. 3 is a block diagram illustrating a controller of a storage device of FIG. 1 according to example embodiments.

FIG. 3 is a block diagram illustrating the controller of the storage device of FIG. 1 according to example embodiments. Below, the terms "throttling level", "throttling performance of the storage device 1200", and "fluctuation level" are used to describe embodiments of the inventive concept easily. The throttling level may indicate a level of the throttling operation that is supported at the storage device 1200. The throttling performance of the storage device 1200 may mean an average speed or a minimum speed of an I/O between the storage device 1200 and the host 1100, with regard to a relevant throttling level. The fluctuation level may mean a difference between a maximum performance and a minimum performance of an I/O between the storage device 1200 and the host 1100, with regard to a relevant throttling level.

In an example embodiment, it is assumed that the degree of throttling becomes stronger as a throttling level increases. The degree of throttling becoming stronger means that a throttling performance and a fluctuation level of the storage device 1200 decrease. That is, as the degree of throttling becomes weaker, the performance of the storage device 1200 may be relatively improved; as the degree of throttling becomes stronger, the storage device 1200 may provide a relatively uniform or stable performance.

Unless differently defined, the above terms may be understood as explained above. However, the terms are used to describe embodiments of the inventive concept more easily, and the inventive concept is not limited thereto and other terms may be used to explain the same concepts.

Referring to FIGS. 1 and 3, the controller 1210 of the storage device 1200 may include the throttling PDT 1211, the throttling manager 1212, a processor 1213, a random access memory (RAM) 1214, a management module 1215, a host interface circuit 1216, and a nonvolatile memory interface circuit 1217.

The throttling PDT 1211 may include information about a throttling performance and a fluctuation level of each of a plurality of throttling levels. For example, as described above, the storage device 1200 according to an embodiment of the inventive concept may perform the throttling operation based on one of the plurality of throttling levels. In detail, when the storage device 1200 performs the throttling operation based on a first throttling level, the performance (e.g., I/O speed) of the storage device 1200 may be a first throttling performance, and a performance fluctuation level may be a first fluctuation level. When the storage device 1200 performs the throttling operation based on a second throttling level, the performance (e.g., I/O speed) of the storage device 1200 may be a second throttling performance, and a performance fluctuation level may be a second fluctuation level.

In the above embodiment, in the case where the second throttling level is higher than the first throttling level, the second throttling performance may be lower than the first throttling performance, but the second fluctuation level may be smaller than the first fluctuation level. For example, as the throttling level becomes higher, the performance or average performance of the storage device 1200 may become lower (e.g., lower speed), but a fluctuation level of the performance may decrease. Therefore, as the throttling level becomes higher, the performance of the storage device 1200 may be maintained more stably or more uniformly.

The throttling manager 1212 may be configured to control the throttling operation of the storage device 1200. For example, the throttling manager 1212 may receive information about a selected throttling level from the host 1100. The throttling manager 1212 may control various operation parameters of the storage device 1200 such that the throttling operation corresponding to the selected throttling level is performed.

The processor 1213 may control overall operations of the controller 1210. The RAM 1214 may be used as a working memory, a cache memory, or a buffer memory of the controller 1210. The RAM 1214 may store or manage various information necessary for the controller 1210 to operate. In an example embodiment, the throttling PDT 1211 and the throttling manager 1212 may be implemented in the form of software, and the throttling PDT 1211 and the throttling manager 1212 implemented in the form of software may be stored in the RAM 1214. The throttling PDT 1211 and the throttling manager 1212 stored in the RAM 1214 may be driven, executed, or managed by the processor 1213.

The management module 1215 may be configured to perform various management operations necessary for the storage device 1200 to operate. For example, the management module 1215 may include the flash translation layer 1201 as described above. The management module 1215 may performs various management operations, such as a garbage collection operation, a bad block replacing operation, a wear-leveling operation, and a mapping table managing operation, such that the storage device 1200 is efficiently used.

The controller 1210 may communicate with the host 1100 through the host interface circuit 1216. In an example embodiment, the host interface circuit 1216 may be implemented based on a communication scheme corresponding to the interface channel IF. For example, the host interface circuit 1216 may include at least one of various interfaces such as a SATA (Serial ATA) interface, a PCIe (Peripheral Component Interconnect Express) interface, a SAS (Serial Attached SCSI) interface, an NVMe (Nonvolatile Memory express) interface, and an UFS (Universal Flash Storage) interface. In an example embodiment, in the case where the throttling operation is to be performed, various operation parameters of the host interface circuit 1216 may be controlled to satisfy a throttling performance or a fluctuation level. That is, various operation parameters may include information for controlling an operation of the host interface circuit 1216.

The controller 1210 may communicate with the nonvolatile memory device 1220 through the nonvolatile memory interface circuit 1217. In an example embodiment, the nonvolatile memory interface circuit 1217 may be implemented based on a NAND interface. The nonvolatile memory interface circuit 1217 may exchange a command CMD, an address ADDR, data "DATA", or a control signal CTRL with the nonvolatile memory device 1220.

Figure 4:
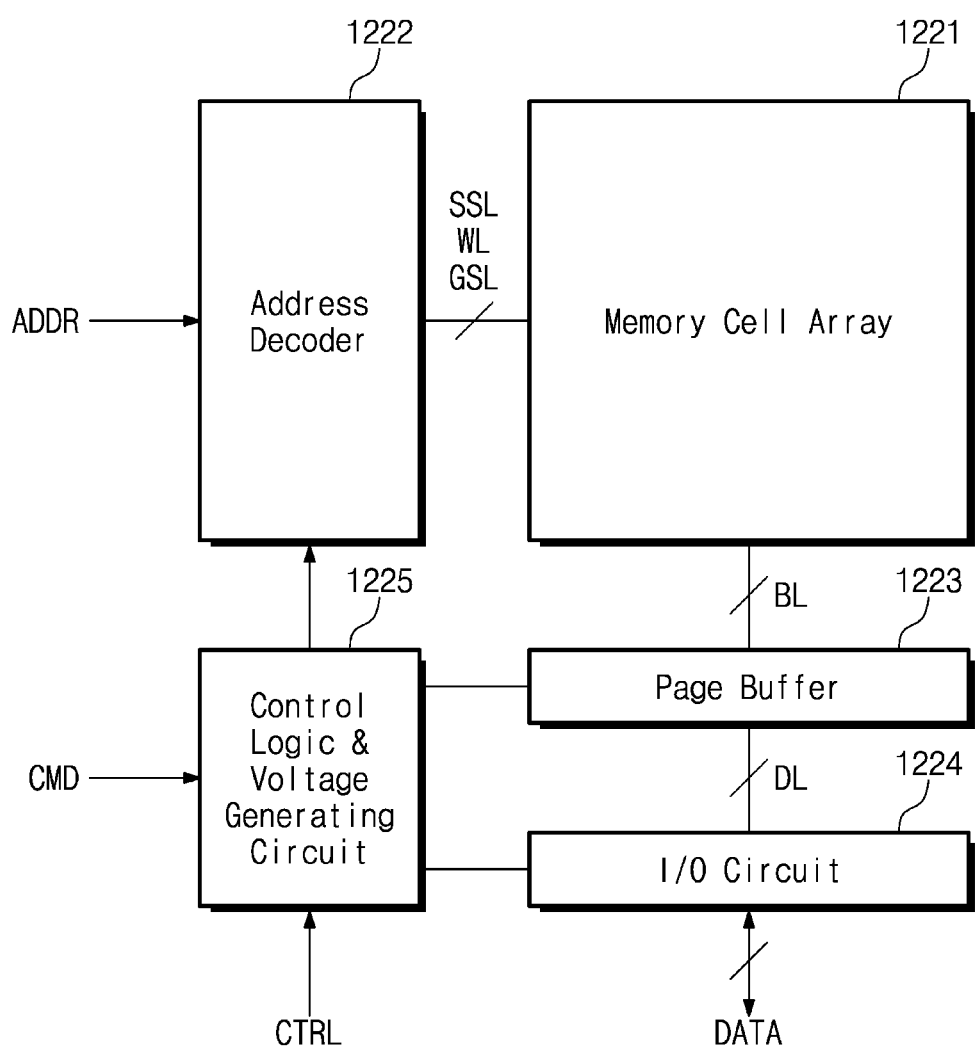
FIG. 4 is a block diagram illustrating a nonvolatile memory device of a storage device of FIG. 1 according to example embodiments.

FIG. 4 is a block diagram illustrating the nonvolatile memory device of the storage device of FIG. 1 according to example embodiments. In an embodiment of FIG. 4, the nonvolatile memory device 1220 may be a NAND flash memory device, but the inventive concept is not limited thereto.

Referring to FIGS. 1, 3, and 4, the nonvolatile memory device 1220 may include a memory cell array 1221, an address decoder 1222, a page buffer 1223, an input/output circuit 1224, a control logic and voltage generating circuit 1225. The memory cell array 1221 may include a plurality of memory blocks. Each of the plurality of memory blocks may include a plurality of cell strings, each of which includes a plurality of cell transistors connected in series between a bit line and a common source line. The plurality of cell transistors may be connected with string selection lines SSL, word lines WL, and ground selection lines GSL.

The address decoder 1222 may be connected with the memory cell array 1221 through the string selection lines SSL, the word lines WL, and the ground selection lines GSL. The address decoder 1222 may receive the address ADDR from the controller 1210. The address decoder 1222 may decode the address ADDR and may control voltages of the string selection lines SSL, the word lines WL, and the ground selection lines GSL based on the decoded result.

The page buffer 1223 may be connected with the memory cell array 1221 through bit lines BL. The page buffer 1223 may be configured to temporarily store data to be stored in the memory cell array 1221 or data read from the memory cell array 1221.

The input/output circuit 1224 may provide the data "DATA" received from the controller 1210 to the page buffer 1223 through data lines DL or may provide the data "DATA" received from the page buffer 1223 through the data lines DL to the controller 1210. In an example embodiment, the input/output circuit 1224 may exchange the data "DATA" with the memory controller 1210 in synchronization with a data strobe signal (DQS) (not illustrated).

The control logic and voltage generating circuit 1225 may control overall operations of the nonvolatile memory device 1220. For example, the control logic and voltage generating circuit 1225 may control the respective components of the nonvolatile memory device 1220 based on the command CMD or the control signal CTRL from the controller 1210 such that the nonvolatile memory device 1220 performs various operations (e.g., a program operation, a read operation, and an erase operation).

Figure 5B:
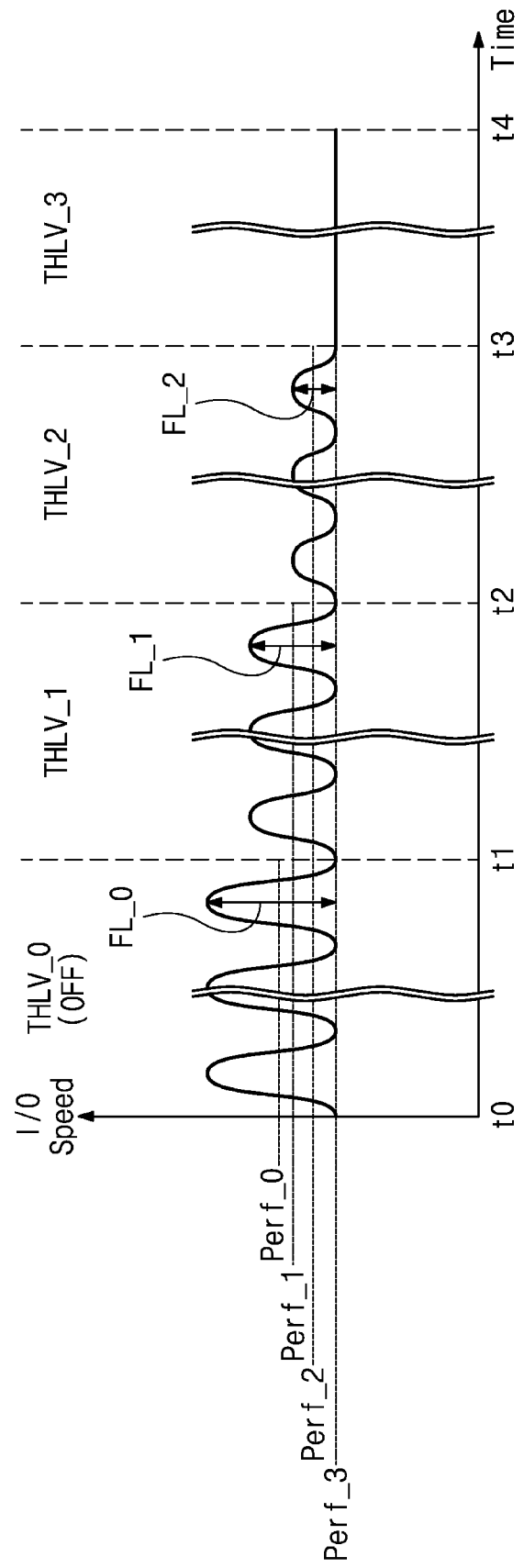

FIGS. 5A and 5B are diagrams for describing an operation of a storage device for each of a plurality of throttling levels according to example embodiments. The throttling PDT 1211 of FIG. 1 is described with reference to FIG. 5A, and an operation of the storage device 1200 according to a throttling level is described with reference to FIG. 5B. In FIG. 5B, a horizontal axis represents a time, and a vertical axis represents an I/O speed of the storage device 1200. The I/O speed may be a read speed of the storage device 1200 or a write speed of the storage device 1200 and indicated as MB/s. A unit of the time may be a second. However, the inventive concept is not limited thereto. For brevity of illustration, in the embodiment of FIG. 5B, a performance graph is illustrated with regard to some throttling levels THLV_0 to THLV_3 of a plurality of throttling levels THLV_0 to THLV_n, but the inventive concept is not limited thereto.

Referring to FIGS. 1, 3, 5A, and 5B, the throttling PDT 1211 of the controller 1210 may include information illustrated in FIG. 5A. For example, the throttling PDT 1211 may include information about fluctuation levels FL_0 to FL_n and throttling performances Perf_0 to Perf_n of the plurality of throttling levels THLV_0 to THLV_n. The throttling levels may be indicated based on levels of the fluctuation and performance of the storage device 1200.

As illustrated in FIG. 5B, the storage device 1200 may perform the throttling operation based on a 0-th throttling level THLV_0 during a period from a 0-th time t0 to a first time t1. In this case, the performance (e.g., average performance) of the storage device 1200 may be a 0-th throttling performance Perf_0, and a fluctuation level may be a 0-th fluctuation level FL_0. In an example embodiment, the 0-th throttling level THLV_0 may indicate the case where the throttling operation is not performed (i.e., throttling off). In an example embodiment, in the case where the throttling operation is not performed, the interface channel IF may have a normal performance. In an example embodiment, an average performance of the interface channel IF having the normal performance may be higher than an average performance of the interface channel IF after the throttling operation is performed, and a fluctuation level of the interface channel IF having the normal performance may be greater than a fluctuation level of the interface channel IF after the throttling operation is performed.

Afterwards, at the first time t1, a throttling level may be changed to a first throttling level THLV_1 by a request of the host 1100, and the storage device 1200 may perform the throttling operation based on the first throttling level THLV_1. In this case, the performance (i.e., average performance) of the storage device 1200 may be a first throttling performance Perf_1, and a fluctuation level may be a first fluctuation level FL_1.

Afterwards, at a second time t2, a throttling level may be changed to a second throttling level THLV_2 by a request of the host 1100, and the storage device 1200 may perform the throttling operation based on the second throttling level THLV_2. In this case, the performance (i.e., average performance) of the storage device 1200 may be a second throttling performance Perf_2, and a fluctuation level may be a second fluctuation level FL_2.

Afterwards, at a third time t3, a throttling level may be changed to a third throttling level THLV_3 by a request of the host 1100, and the storage device 1200 may perform the throttling operation based on the third throttling level THLV_3 during a period from the third time t3 to a fourth time t4. In this case, the performance (i.e., average performance) of the storage device 1200 may be a third throttling performance Perf 3. In an example embodiment, the third throttling level THLV_3 may indicate a level that allows the performance of the storage device 1200 to be maintained uniformly. In this case, a fluctuation level may be "0".

In an example embodiment, the first throttling level THLV_1 may be higher than the 0-th throttling level THLV_0, the second throttling level THLV_2 may be higher than the first throttling level THLV_1, and the third throttling level THLV_3 may be higher than the second throttling level THLV_2. In this case, as illustrated in FIG. 5B, the first fluctuation level FL_1 may be smaller than the 0-th fluctuation level FL_0, and the second fluctuation level FL_2 may be smaller than the first fluctuation level FL_1. In addition, the first throttling performance Perf_1 may be lower than the 0-th throttling performance Perf_0, the second throttling performance Perf_2 may be lower than the first throttling performance Perf_1, and the third throttling performance Perf 3 may be lower than the second throttling level Perf_2. Accordingly, as a throttling level increases, a throttling performance and a fluctuation level may decrease, and thus, the performance of the storage device 1200 may become more uniform.

As described above, the storage device 1200 according to an embodiment of the inventive concept may perform the throttling operation based on the plurality of throttling levels THLV_0 to THLV_n, depending on a request of the host 1100. Accordingly, because an optimum performance (e.g., a maximum performance priority or a consistency priority) may be provided with regard to various functions of the host 1100, the storage device 1200 with selectable and a most desirable performance is provided.

Figure 6:
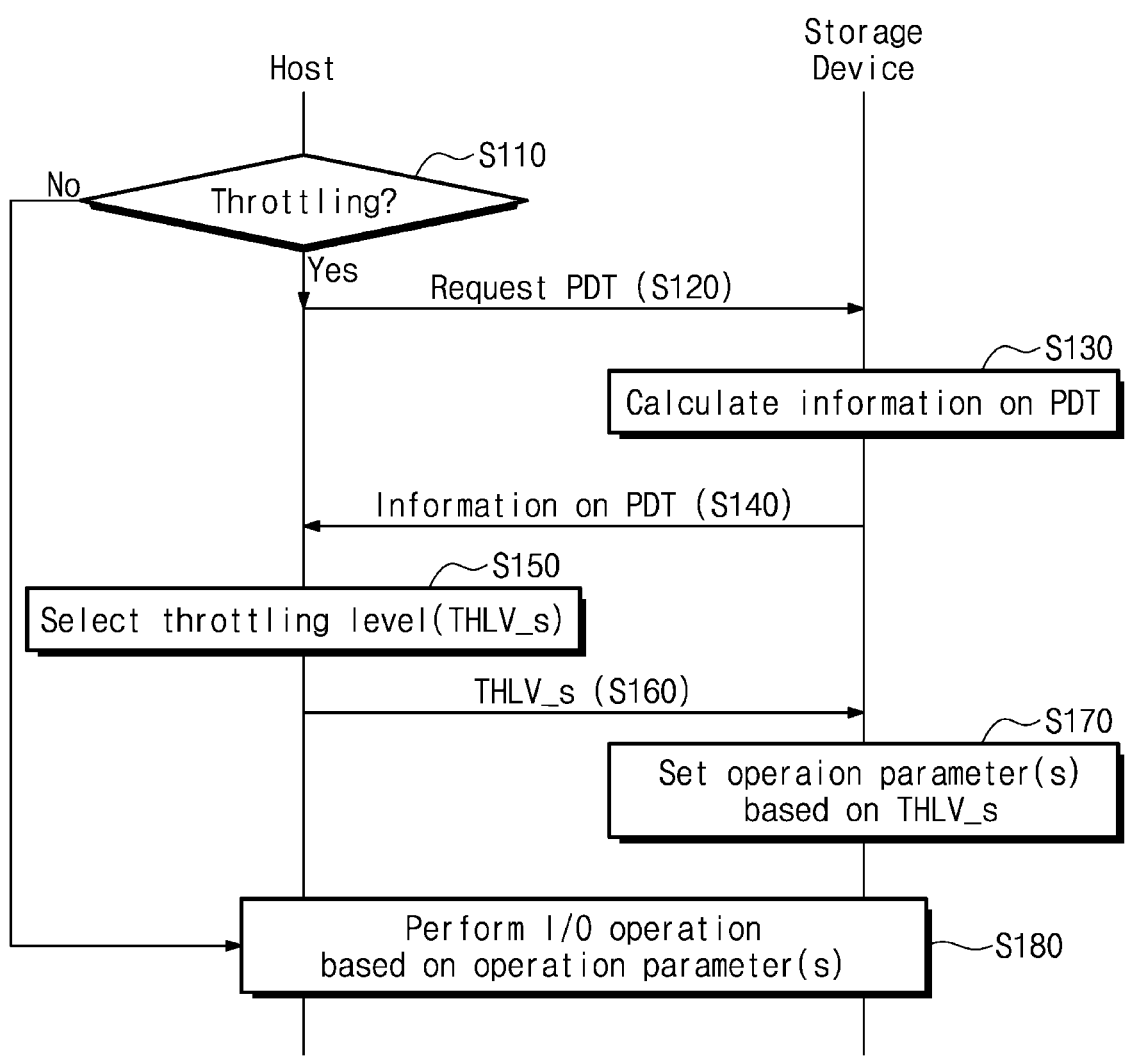
FIG. 6 is a flowchart illustrating an operation of the storage system of FIG. 1 according to example embodiments.

FIG. 6 is a flowchart illustrating an operation of the storage system of FIG. 1 according to example embodiments. Referring to FIGS. 1, 5A, 5B, and 6, in operation S110, the host 1100 may determine whether throttling is required. For example, the host 1100 may manage a priority for each of a plurality of applications. In a situation where the storage device 1200 does not perform the throttling operation, the host 1100 may execute a first application in which a priority is associated with a performance consistency. In this case, because the first application is associated with a performance consistency or requires a performance consistency, the host 1100 may recognize that the throttling operation is required. In an example embodiment, in the case where the performance consistency is required, there may be required the throttling operation that is based on a relatively high throttling level.

In operation S120, the host 1100 may request the throttling PDT 1211 to the storage device 1200. In operation S130, the storage device 1200 may determine information about the throttling PDT 1211. For example, as described with reference to FIG. 5A, the throttling PDT 1211 may be stored in the RAM 1214 of the controller 1210 of the storage device 1200. The controller 1210 may read all or a portion of the throttling PDT 1211 stored in the RAM 1214.

In an example embodiment, the throttling PDT 1211 may be in advance determined in the process of manufacturing the storage device 1200 or in an initialization process. Alternatively, the throttling PDT 1211 may be updated or reconstructed under a particular condition while the storage device 1200 is being driven or operated. For example, the controller 1210 may monitor the performance of the storage device 1200 periodically and may update the throttling PDT 1211 selectively based on the monitored performance.

In operation S140, the storage device 1200 may transfer information about the throttling PDT 1211 to the host 1100. In operation S150, the host 1100 may select one of the plurality of throttling levels THLV_1 to THLV_n based on the throttling PDT 1211.

For example, in the case where the first application having a priority associated with a performance consistency is executed, the host 1100 may select a throttling level being the highest or relatively high from among the plurality of throttling levels THLV_1 to THLV_n included in the throttling PDT 1211. Alternatively, in the case where an application having a priority associated with a maximum performance is executed, the host 1100 may select a throttling level being the lowest from among the plurality of throttling levels THLV_1 to THLV_n included in the throttling PDT 1211. Alternatively, in the case where there is required a throttling operation having a priority associated with a particular performance or higher and a particular fluctuation level or lower, the host 1100 may select a throttling level coinciding with the above conditions from among the plurality of throttling levels THLV_1 to THLV_n included in the throttling PDT 1211. In this manner, and in some embodiments, a throttling level serves as an indicator to indicate an operational setting for the storage device 1200, where different throttling levels are associated with different combinations of fluctuation levels and performance levels (e.g., higher throttling levels may be associated with lower fluctuation and lower performance, and vice versa).

In operation S160, the host 1100 may transfer information about the selected throttling level THLV_s to the storage device 1200. In operation S170, the storage device 1200 may set one or more operation parameters of the storage device 1200 based on the selected throttling level THLV_s. For example, based on the selected throttling level THLV_s, the storage device 1200 may set or re-set (or, remove) various operation parameters of components associated with the performance of the storage device 1200 or various operation parameters of the host interface circuit 1216, such as a buffer release time, a response transfer time, a data transfer width, and a command queue. In an example embodiment, as the storage device 1200 sets the operation parameters, the performance of the storage device 1200, for example, the interface channel IF may have a throttling performance corresponding to the selected throttling level THLV_s.

In operation S180, the host 1100 and the storage device 1200 may perform an I/O operation based on the set operation parameters. For example, the host 1100 may transfer data to the storage device 1200 for the purpose of storing data in the storage device 1200 or may be provided with data from the storage device 1200. In this case, because the operation parameters of the storage device 1200 are set depending on the selected throttling level THLV_s from the host 1100, the storage device 1200 may provide a performance and a fluctuation level corresponding to the selected throttling level THLV_s. Accordingly, the storage device 1200 may provide a performance optimized for the request of the host 1100.

FIGS. 7A to 7D are diagrams for describing an operation according to the flowchart of FIG. 6 according to example embodiments. Below, for convenience of description, it is assumed that the host 1100 selects a throttling level for the storage device 1200 depending on a priority of an application to be driven. However, the inventive concept is not limited thereto. For example, the host 1100 may select a throttling level for the storage device 1200 based on various other environment variables, as well as a priority of an application.

For convenience of description, the description associated with the above components and components unnecessary to describe embodiments of FIGS. 7A to 7D will be omitted.

Referring to FIGS. 7A to 7D, the storage system 1000 may include the host 1100 and the storage device 1200. The host 1100 may include the storage management module 1101, and the storage device 1200 may include the throttling PDT 1211 and the throttling manager 1212. The host 1100, the storage management module 1101, the storage device 1200, the throttling PDT 1211, and the throttling manager 1212 are described above, and thus, additional description will be omitted to avoid redundancy.

Figure 7A:
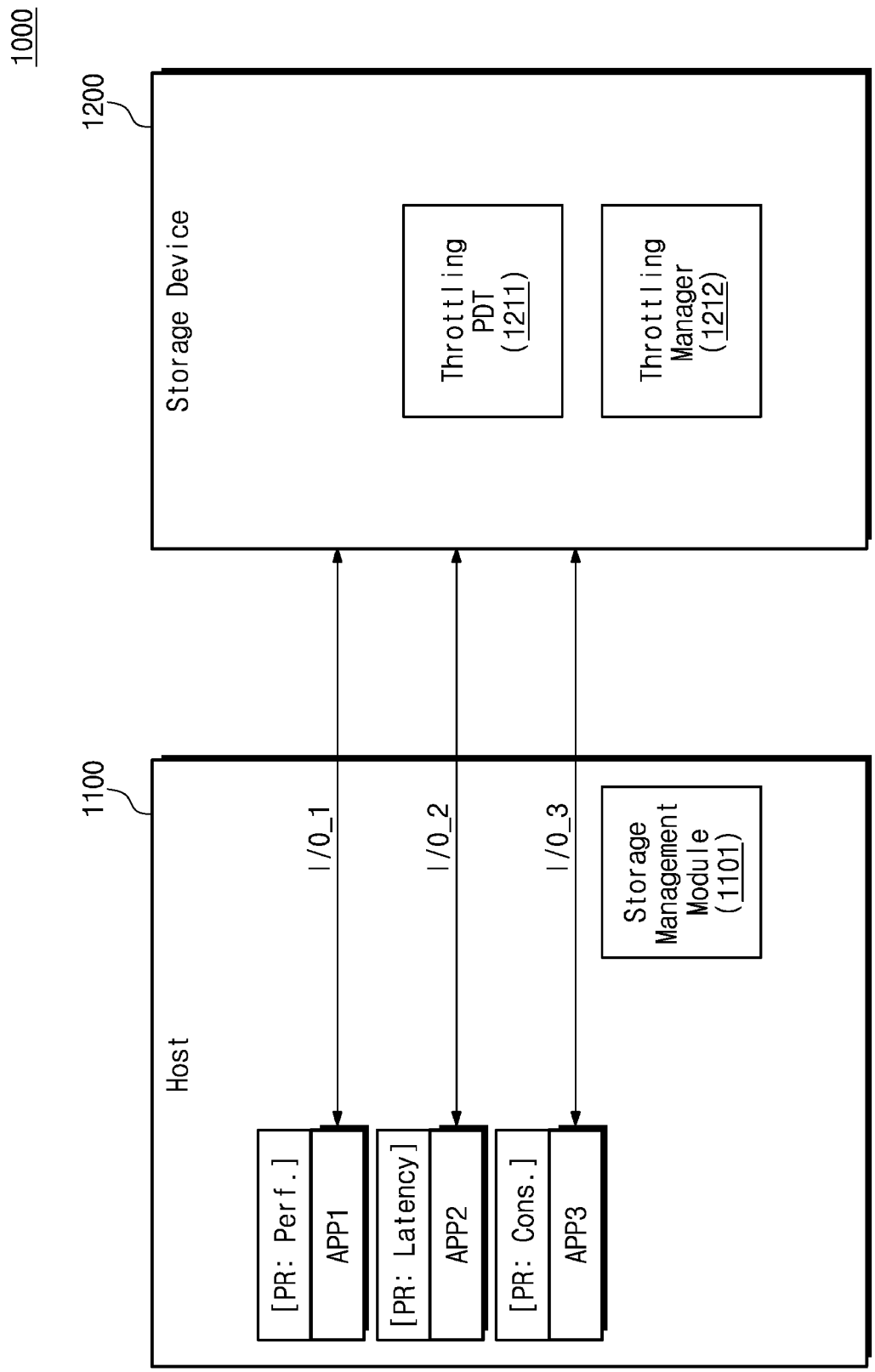

As illustrated in FIG. 7A, the host 1100 may execute first to third applications APP1 to APP3. The first to third applications APP1 to APP3 may generate first to third I/Os I/O_1 to I/O_3, respectively.

The host 1100 may manage a priority PR for each of the first to third applications APP1 to APP3. For example, the priority of the first application APP1 may be a performance Perf. That is, the first I/O I/O_1 generated from the first application APP1 may require a high performance or a high average performance in the communication with the storage device 1200. The priority of the second application APP2 may be a latency. That is, the second I/O I/O_2 generated from the second application APP2 may require a low latency in the communication with the storage device 1200. The priority of the third application APP3 may be a performance consistency. That is, the third I/O I/O_3 generated from the third application APP3 may require a performance of a uniform level in the communication with the storage device 1200. The priority of each of the first to third applications APP1 to APP3 may be managed by the host 1100.

In an example embodiment, although not illustrated in drawings, the host 1100 may include a priority managing module configured to manage a priority of each of the first to third applications APP1 to APP3. The priority managing module may manage a priority for each of a plurality of applications that are executed on the host 1100. The priority managing module may manage or change the priority for each of the plurality of applications depending on a request of a user. Alternatively, the priority managing module may learn an execution manner or an execution environment of each of the plurality of applications and may manage or change the priority of each of the plurality of applications based on the learned result.

Figure 7B:
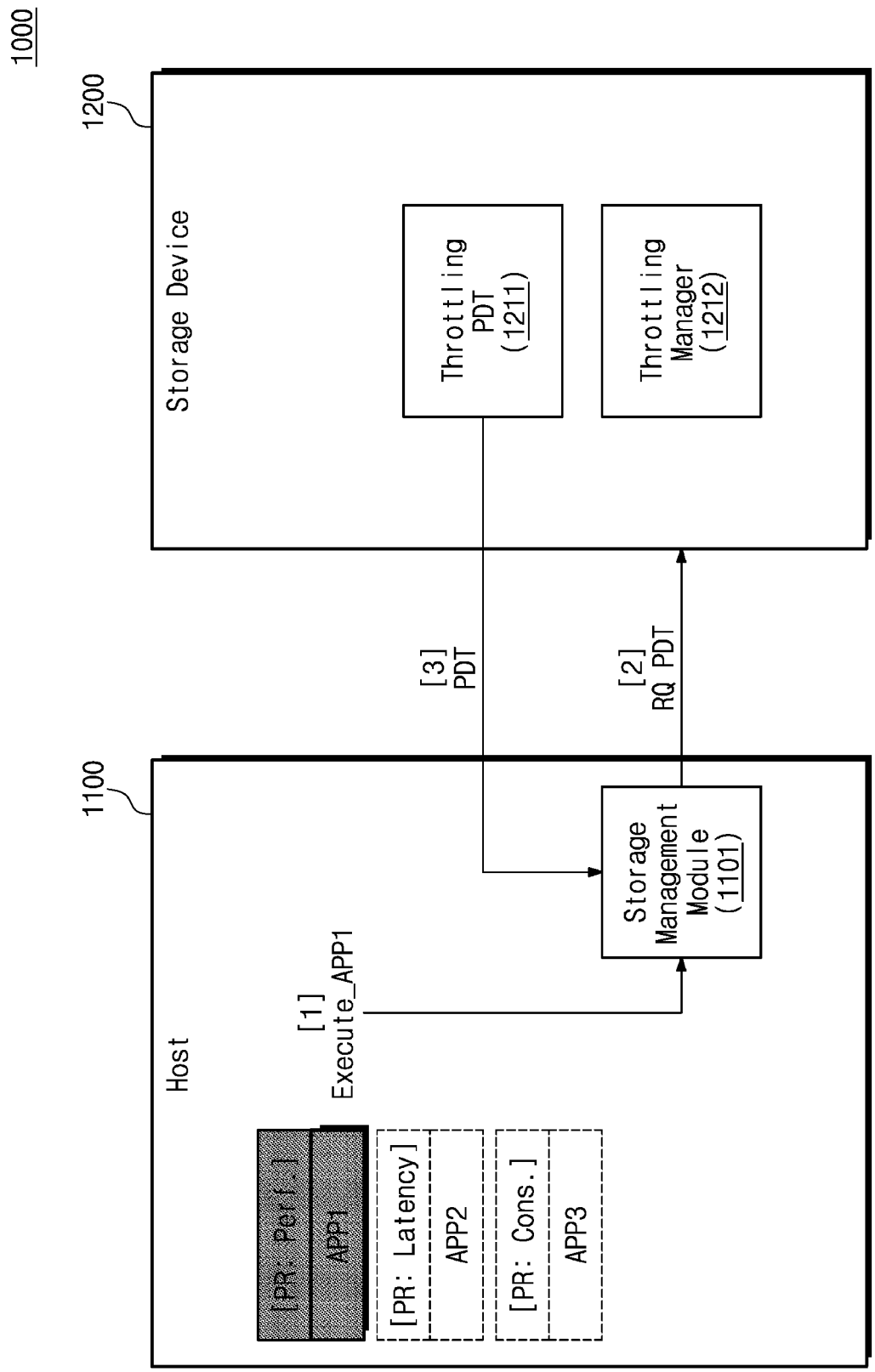

As illustrated in FIG. 7B, the first application APP1 may be executed on the host 1100 (refer to [1] in FIG. 7B). In response to the execution of the first application APP1 on the host 1100, the storage management module 1101 may request the throttling PDT 1211 to the storage device 1200 (RQ PDT, refer to [2] of FIG. 7B). In response to the request RQ PDT for the throttling PDT 1211, the storage device 1200 may provide information about the throttling PDT 1211 to the storage management module 1101 of the host 1100 (PDT, refer to [3] of FIG. 7B). In an example embodiment, in the case where the storage management module 1101 includes the information of the throttling PDT 1211, the operation according to the embodiment of FIG. 7B may be omitted.

Figure 7C:
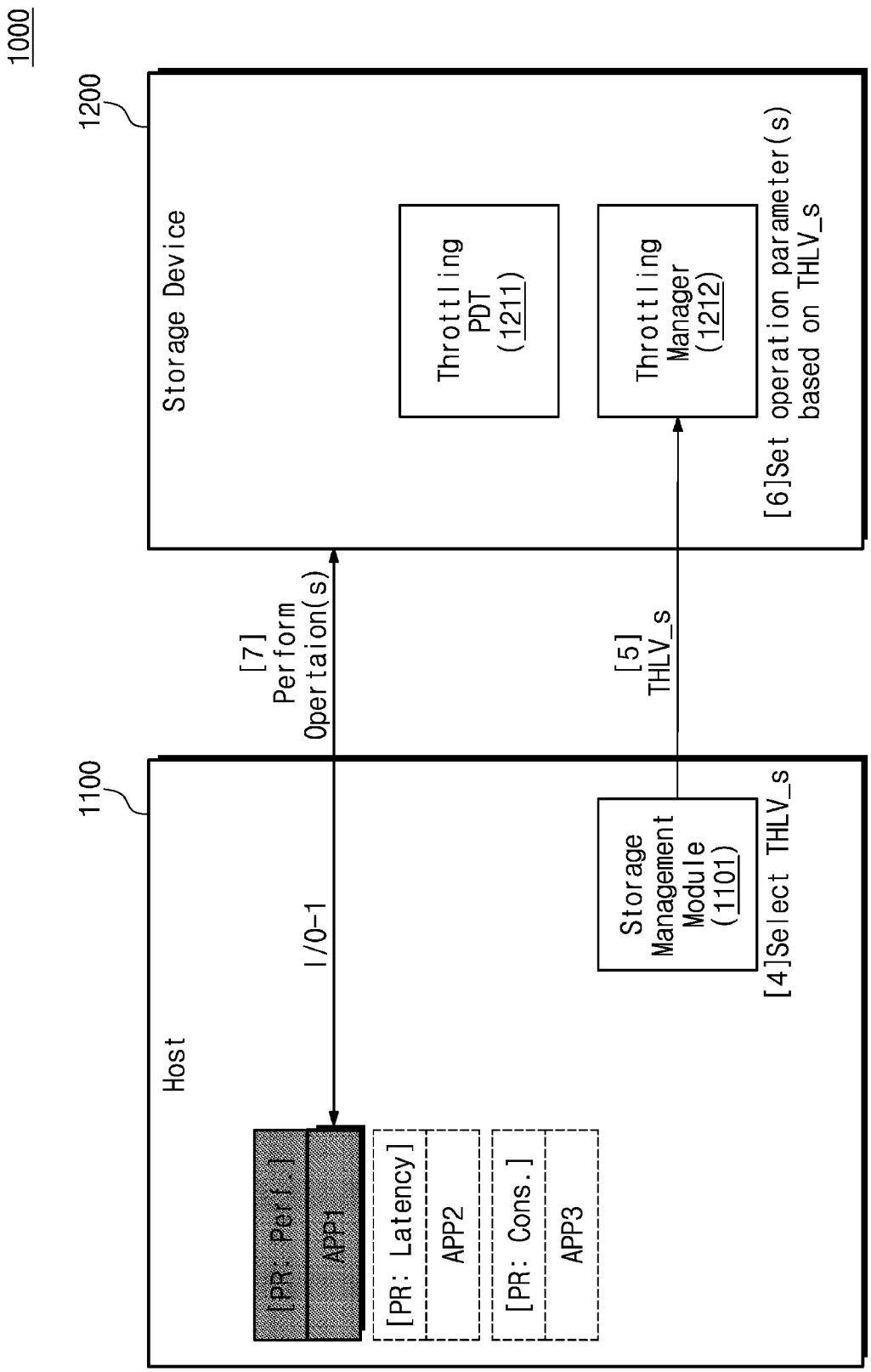

As illustrated in FIG. 7C, the storage management module 1101 may select the throttling level THLV_s corresponding to the priority PR of the first application APP1, based on the throttling PDT 1211 (refer to [4] of FIG. 7C). For example, the priority PR of the first application APP1 may be associated with the performance Perf. In this case, as described with reference to FIGS. 5A and 5B, the 0-th throttling level THLV_0 corresponding to the highest average performance may be selected as the throttling level THLV_s.

The storage management module 1101 may transfer information about the selected throttling level THLV_s (e.g., an indicator of the selected throttling level THLV_s) to the storage device 1200 (refer to [5] of FIG. 7C). The throttling manager 1212 of the storage device 1200 may set operation parameters of the storage device 1200 based on the selected throttling level THLV_s (refer to [6] of FIG. 7C). For example, the throttling manager 1212 may set or re-set operation parameters of the storage device 1200 such that an average performance and a fluctuation level corresponding to the selected throttling level THLV_s are satisfied.

Afterwards, the host 1100 and the storage device 1200 may perform an operation for the first I/O I/O_1 generated by the first application APP1 (refer to [7] of FIG. 7C). In this case, because the storage device 1200 is in a state of setting the operation parameters based on the throttling level THLV_s selected by the host 1100, the storage device 1200 may provide or support a fluctuation level or a throttling performance suitable for the priority PR of the first application APP1.

As illustrated in FIG. 7D, while the first application APP1 is executed or after the first application APP1 is ended, the third application APP3 may be executed (refer to [8] of FIG. 7D). In response to the execution of the third application APP3, the storage management module 1101 may change the selected throttling level THLV_s (refer to [9] of FIG. 7D). For example, the priority PR of the third application APP3 may be associated with the performance consistency Cons. In this case, a relatively high throttling level (e.g., the third throttling level THLV_3 of FIG. 5B) may be required. As such, the storage management module 1101 may select a relatively high throttling level as the selected throttling level THLV_s.

The storage management module 1101 may transfer information of the selected throttling level THLV_s thus changed (e.g., an indicator of the changed throttling level THLV_s) to the storage device 1200 (refer to [10] of FIG. 7D), and the throttling manager 1212 of the storage device 1200 may set or re-set operation parameters based on the selected throttling level THLV_s (refer to [11] of FIG. 7D). Afterwards, the host 1100 and the storage device 1200 may perform the third I/O I/O_3 generated by the third application APP3.

In the embodiment illustrated in FIG. 7D, even though the third application APP3 is executed, the storage management module 1101 may not request the throttling PDT 1211 to the storage device 1200. The reason is that the storage management module 1101 already includes the information about the throttling PDT 1211 as described with reference to FIG. 7B. Alternatively, even though the storage management module 1101 already includes the throttling PDT 1211, because the throttling PDT 1211 may be updated, the storage management module 1101 may request the throttling PDT 1211 to the storage device 1200. A way to exchange the throttling PDT 1211 may be determined by a given policy between the host 1100 and the storage device 1200.

In an example embodiment, the exchange of the first to third I/Os I/O_1~I/O_3 generated by the first to third applications APP1 to APP3 and pieces of information required to set a throttling level (e.g., to request the throttling PDT 1211, to receive the throttling PDT 1211, or to transfer information about the selected throttling level THLV_s) may be made between the host 1100 and the storage device 1200 through an in-band or a main channel of the interface channel IF between the host 1100 and the storage device 1200.

Alternatively, the first to third I/Os I/O_1~I/O_3 generated by the first to third applications APP1 to APP3 may be conveyed through the in-band or the main channel of the interface channel IF, and the exchange of the pieces of information required to set a throttling level may be made through a side-band or a sub-channel of the interface channel IF or through an auxiliary interface separated from the interface channel IF.

In the embodiments of FIGS. 7A to 7D, the description is given as the host 1100 manages the priorities PR of the applications APP1 to APP3, but the inventive concept is not limited thereto. For example, the host 1100 may specify and manage a throttling level for each of a plurality of applications, based on the throttling PDT 1211 from the storage device 1200. In this case, the storage management module 1101 of the host 1100 may directly check a throttling level corresponding to an application that is executed or generates an I/O.

Figure 8:
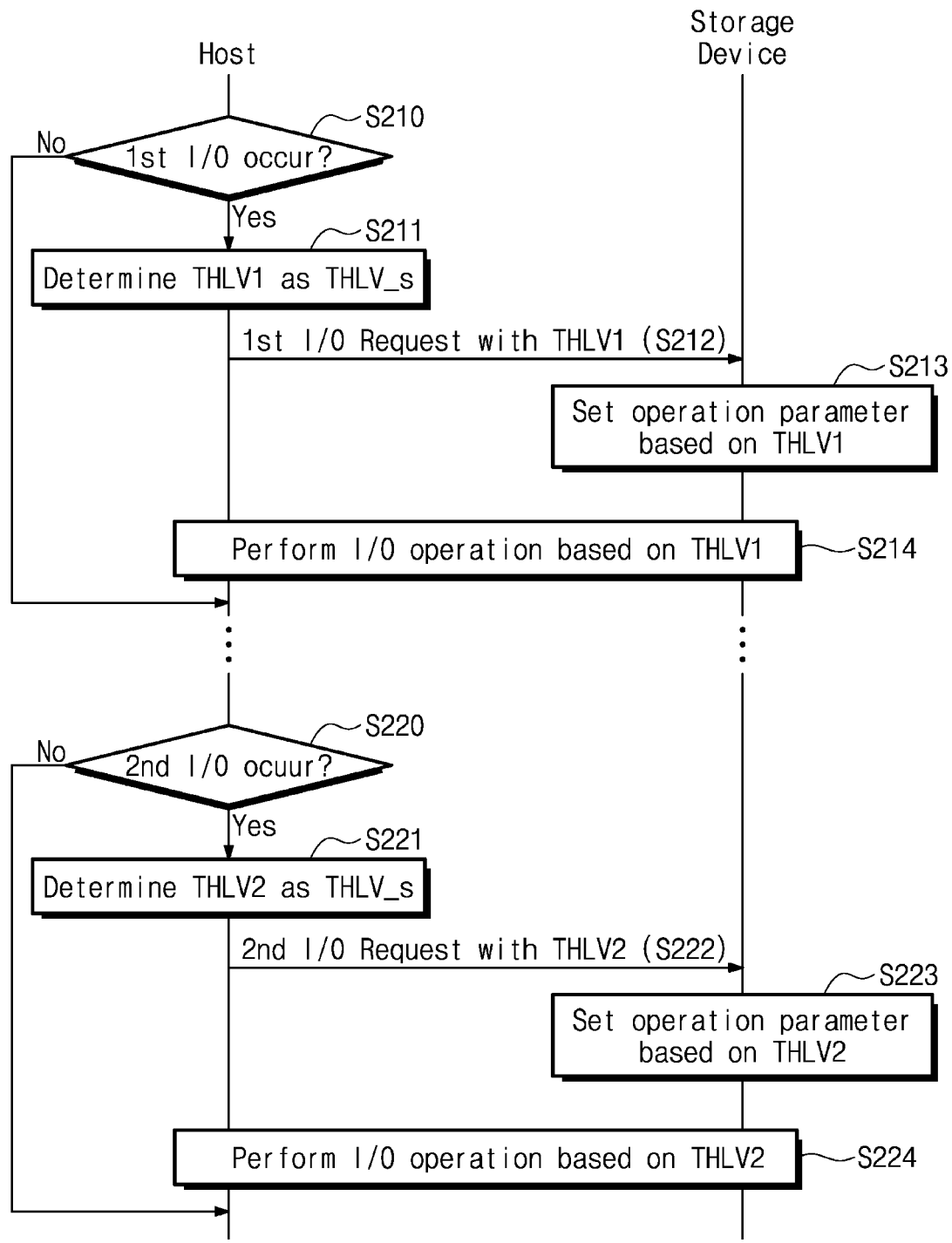
FIG. 8 is a flowchart illustrating an operation of the storage system of FIG. 1 according to example embodiments.
Figure 9:
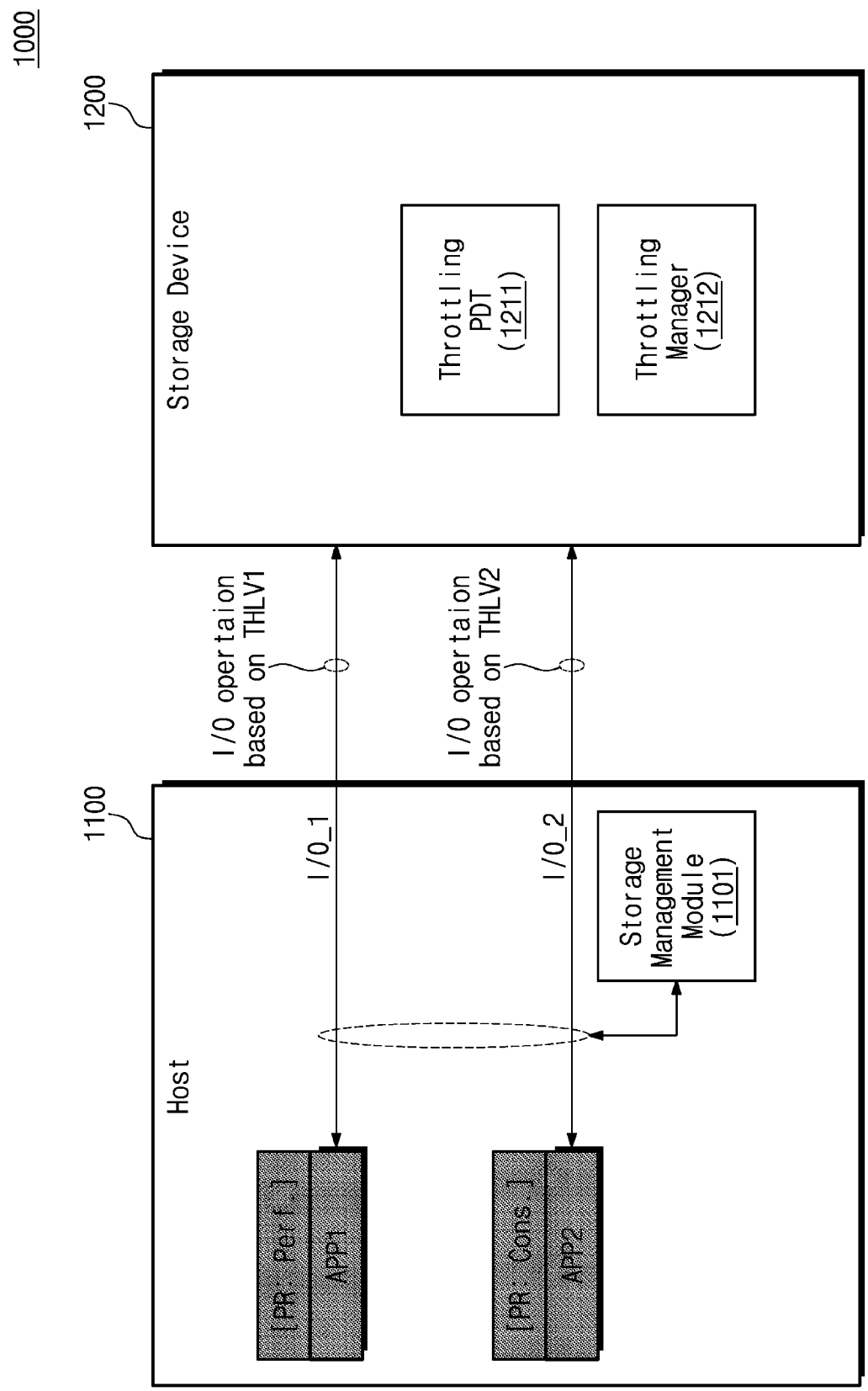
FIG. 9 is a block diagram for describing an operation according to the flowchart of FIG. 8 according to example embodiments.

FIG. 8 is a flowchart illustrating an operation of the storage system of FIG. 1 according to example embodiments. FIG. 9 is a block diagram for describing an operation according to a flowchart of FIG. 8 according to example embodiments. For brevity of illustration and convenience of description, components that are unnecessary to describe embodiments of FIGS. 8 and 9 are omitted, and thus, additional description will be omitted to avoid redundancy.

For convenience of description, it is assumed that the storage management module 1101 already includes information about the throttling PDT 1211. For example, in an initialization operation of the storage system 1000, the storage management module 1101 may receive the throttling PDT 1211 from the storage device 1200. Alternatively, the storage management module 1101 may request the throttling PDT 1211 from the storage device 1200 periodically or randomly (e.g., in response to a request of a particular condition), and may receive or update information about the throttling PDT 1211 from the storage device 1200.

Referring to FIGS. 1, 8, and 9, in operation S210, the host 1100 may determine whether a first I/O is generated. For example, as illustrated in FIG. 9, the host 1100 may execute the first and second applications APP1 and APP2. The first and second applications APP1 and APP2 may generate the first and second I/Os I/O_1 and I/O_2, respectively. The host 1100 may recognize that the first I/O I/O_1 is generated from the first application APP1. In the case where the first I/O I/O_1 is not generated, the host 1100 may not perform a separate operation.

When it is determined that the first I/O I/O_1 is generated, in operation S211, the host 1100 may determine a first throttling level THLV1 as the selected throttling level THLV_s. For example, as illustrated in FIG. 9, the priority PR of the first application APP1 may be associated with the performance Perf. In this case, as in the above description, the first I/O I/O_1 generated from the first application APP1 may require a high performance or a high average performance in the communication between the host 1100 and the storage device 1200. As such, the storage management module 1101 of the host 1100 may determine the first throttling level THLV1 being relatively low as the selected throttling level THLV_s, with regard to the first I/O I/O_1.

In operation S212, the host 1100 may transfer a first I/O request to the storage device 1200. In this case, the first I/O request may include information about the first throttling level THLV1 determined as the selected throttling level THLV_s. For example, the information about the first throttling level THLV1 may be included in a particular field of the first I/O request, and the first I/O request in which the information about the first throttling level THLV1 is included may be provided to the storage device 1200 through the interface channel IF. In an example embodiment, an operation including the information about the first throttling level THLV1 in the first I/O request may be performed by the device driver 1130 (refer to FIG. 2) depending on a request of the storage management module 1101.

In operation S213, the storage device 1200 may set operation parameters of the storage device 1200 based on the first throttling level THLV1. In operation S213, the host 1100 and the storage device 1200 may perform an operation corresponding to the first I/O request. In this case, the host 1100 and the storage device 1200 may perform the operation corresponding to the first I/O request depending on a fluctuation level and a throttling performance corresponding to the first throttling level THLV1.

Afterwards, in operation S220, the host 1100 may determine whether a second I/O I/O_2 is generated. For example, as illustrated in FIG. 9, the second I/O I/O_2 may be generated by the second application that is driven on the host 1100. The storage management module 1101 of the host 1100 may recognize that the second I/O I/O_2 is generated from the second application APP2. In the case where the second I/O I/O_2 is not generated, the host 1100 may not perform a separate operation.

In operation S221, the host 1100 may determine a second throttling level THLV2 as the selected throttling level THLV_s. For example, as illustrated in FIG. 9, the priority PR of the second application APP2 may be associated with the performance consistency Cons. In this case, the second I/O I/O_2 generated from the second application APP2 may require processing of a uniform performance. The host 1100 may select the second throttling level THLV2 as the selected throttling level THLV_s for the second I/O I/O_2.

In an example embodiment, the second throttling level THLV2 may be higher than the first throttling level THLV1 described above. That is, a throttling operation that is based on the second throttling level THLV2 may provide a more stable or uniform performance than a throttling operation that is based on the first throttling level THLV1.

The host 1100 and the storage device 1200 may perform operation S222 to operation S224. Operation S222 to operation S224 are similar to operation S212 to operation S214 of FIG. 8 except that the selected throttling level THLV_s is the second throttling level THLV2, and thus, additional description will be omitted to avoid redundancy.

As described above, the host 1100 of the storage system 1000 according to an embodiment of the inventive concept may determine a selected throttling level for each generated I/O and may provide information about the selected throttling level to the storage device 1200 together with the I/O request. The storage device 1200 may process the I/O based on the selected throttling level provided from the host 1100. Accordingly, an optimum performance may be provided with respect to each of a plurality of I/Os.

In the embodiments of FIGS. 8 and 9, there is described a configuration where the host 1100 determines a selected throttling level for each of a plurality of I/Os, but the inventive concept is not limited thereto. For example, the host 1100 may classify the plurality of I/Os by using stream identifiers and may perform, for example, a throttling operation, which is based on a different throttling level, by using a stream identifier of each of the plurality of I/Os.

Figure 10:
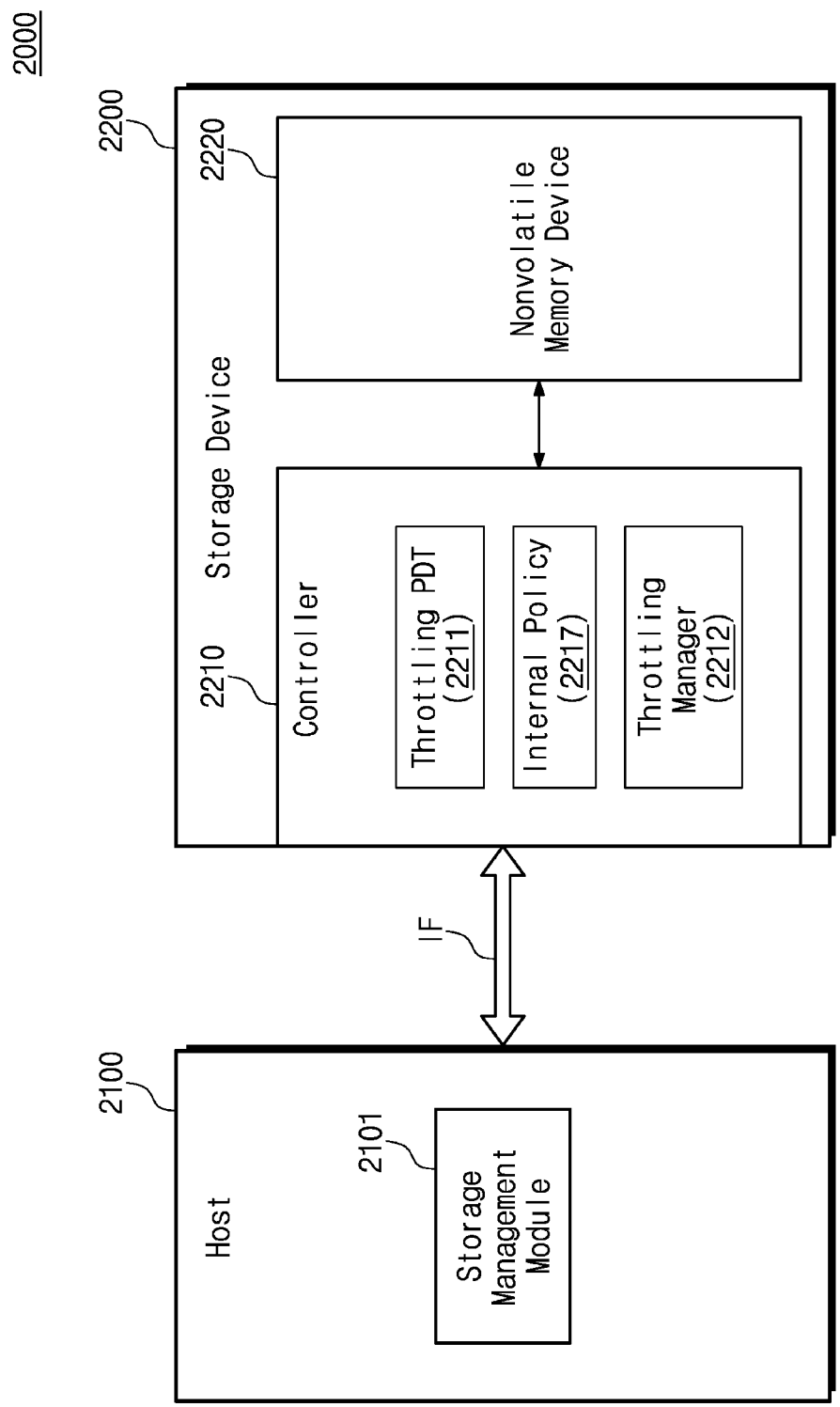
FIG. 10 is a block diagram illustrating a storage system according to an embodiment of the inventive concept.

FIG. 10 is a block diagram illustrating a storage system according to an embodiment of the inventive concept. Referring to FIG. 10, a storage system 2000 may include a host 2100 and a storage device 2200. The host 2100 and the storage device 2200 may communicate through the interface channel IF. The host 2100 may include a storage management module 2101. The storage device 2200 may include a controller 2210 and a nonvolatile memory device 2220. The controller 2210 may include a throttling PDT 2211, a throttling manager 2212, and an internal policy 2217. The host 2100, the storage management module 2101, the storage device 2200, the controller 2210, the nonvolatile memory device 2220, the throttling PDT 2211, and the throttling manager 2212 are described above, and thus, additional description will be omitted to avoid redundancy.

The controller 2210 of FIG. 10 may further include the internal policy 2217. The internal policy 2217 may include information of a throttling level according to various operation patterns that are performed in the storage device 2200. In an example embodiment, the internal policy 2217 may be stored in a RAM (refer to FIG. 3) included in the controller 2210 or in a separate storage circuit.

For example, in the embodiments described with reference to FIGS. 1 to 4, 5A, 5B, 6, 7A to 7D, 8, and 9, a throttling level of a storage device may be determined by a host. In contrast, the storage device 2200 of FIG. 10 may determine a final throttling level based on a selected throttling level provided from the host 2100 and an internal throttling level determined by the internal policy 2217. In an example embodiment, the final throttling level may be identical to the selected throttling level determined by the host 2100. Alternatively, the final throttling level may be different from the selected throttling level determined by the host 2100 under a particular condition. An operation of the storage device 2200 of FIG. 10 will be more fully described with reference to drawings below.

FIG. 11 is a diagram for describing an operation of an internal policy of FIG. 10 according to example embodiments. Referring to FIGS. 10 and 11, the internal policy 2217 may include a table illustrated in FIG. 11. The internal policy 2217 may include a relationship between state information State and the plurality of throttling levels THLV_0 to THLV_3.

The throttling manager 2212 may select an internal throttling level based on the internal policy 2217. For example, in the case where the state of the storage device 2200 is a 0-th state ST_0, the throttling manager 2212 may select the 0-th throttling level THLV_0 as the internal throttling level. The 0-th state ST_0 may indicate a state in which all operations being performed or pending at the storage device 2200 are a write operation WR. In an example embodiment, all the operations being performed or pending at the storage device 2200 may indicate operations between the controller 2210 and the nonvolatile memory device 2220.

In the case where the state of the storage device 2200 is a first state ST_1, the throttling manager 2212 may select the first throttling level THLV_1 as the internal throttling level. The first state ST_1 may indicate a state in which a part (e.g., 50%) of operations being performed or pending at the storage device 2200 is the write operation WR.

In the case where the state of the storage device 2200 is a second state ST_2, the throttling manager 2212 may select the second throttling level THLV_2 as the internal throttling level. The second state ST_2 may indicate a state in which a part (e.g., 10%) of operations being performed or pending at the storage device 2200 is the write operation WR.

In the case where the state of the storage device 2200 is a third state ST_3, the throttling manager 2212 may select the third throttling level THLV_3 as the internal throttling level. The third state ST_3 may indicate a state in which all the operations being performed or pending at the storage device 2200 are a read operation RD.

As described above, the throttling manager 2212 of the controller 2210 of the storage device 2200 may determine the internal throttling level corresponding to the state of the storage device 2200, based on the internal policy 2217. The internal policy 2217 described above is only an example for describing an embodiment of the inventive concept, and the inventive concept is not limited thereto. State information included in the internal policy 2217 may be implemented with a combination of one or more various factor information, such as a command queue depth, a write amplification factor (WAF), a data sector size, and temperature information, as well as a command ratio.

Figure 12:
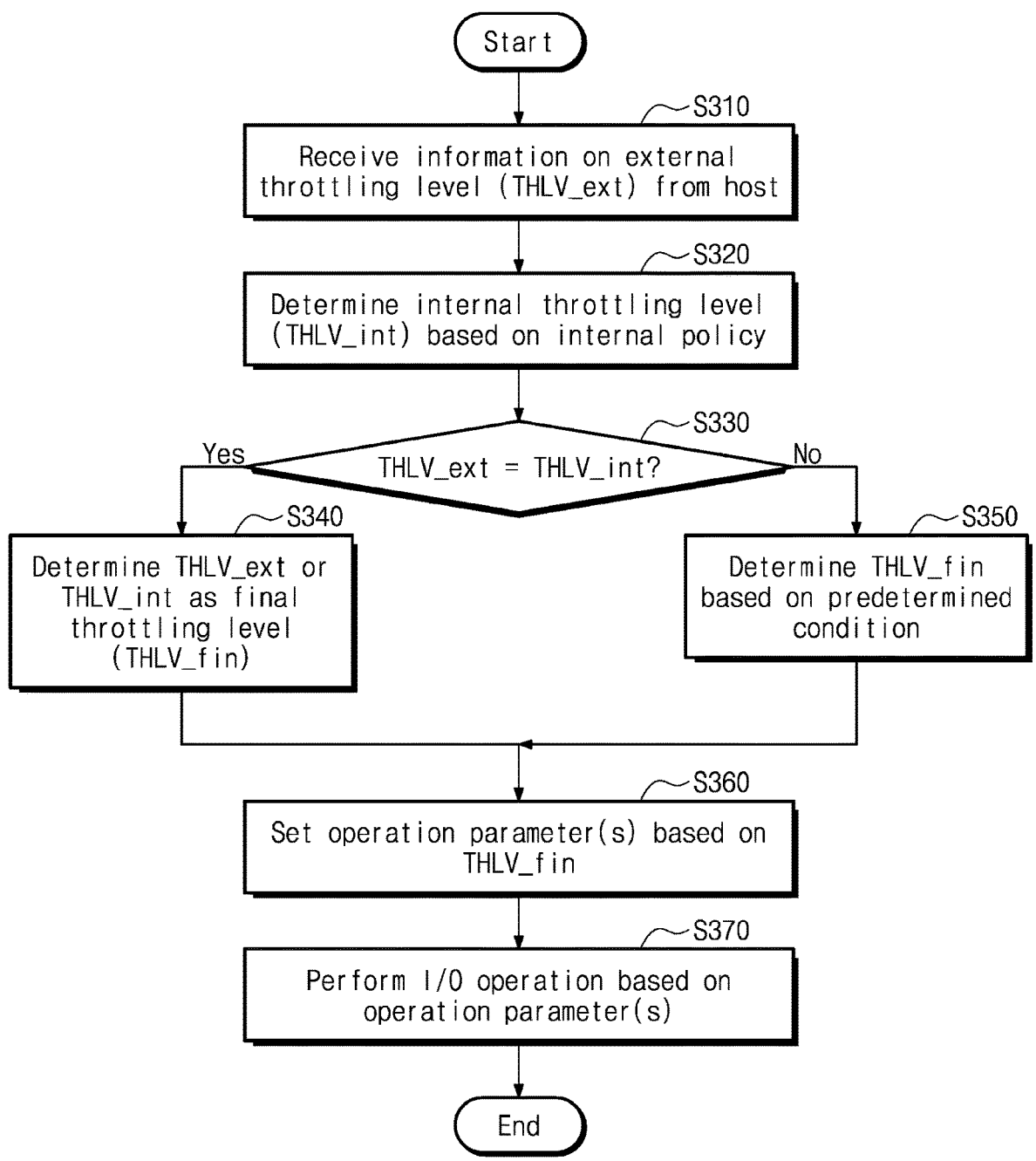
FIG. 12 is a flowchart illustrating an operation of a storage device of FIG. 10 according to example embodiments.

FIG. 12 is a flowchart illustrating an operation of the storage device of FIG. 10 according to example embodiments. For brevity of illustration and convenience of description, an operation in which the host 2100 (or the storage management module 2101) determines a selected throttling level is omitted in FIG. 12. However, the inventive concept is not limited thereto. For example, depending on the operation method described with reference to FIGS. 1 to 4, 5A, 5B, 6, 7A to 7D, 8, and 9, the host 2100 may determine a selected throttling level for the storage device 2200 and may transfer information about the selected throttling level to the storage device 2200.

Below, to describe an embodiment of the inventive concept clearly, a selected throttling level received from the host 2100 is called an "external throttling level THLV_ext", and a throttling level determined based on the internal policy 2217 is called an "internal throttling level THLV_int". Also, a throttling level that is determined based on the external throttling level THLV_ext or the internal throttling level THLV_int is called a "final throttling level THLV_fin". The throttling manager 2212 of the storage device 2200 may perform the throttling operation based on the final throttling level THLV_fin.

Referring to FIGS. 10 to 12, in operation S310, the storage device 2200 may receive information about the external throttling level THLV_ext from the host 2100. Operation S310 is similar to an operation, in which the host 1100 determines the selected throttling level THLV_s and transfers information about the selected throttling level THLV_s, described with reference to FIGS. 1 to 4, 5A, 5B, 6, 7A to 7D, 8, and 9, and thus, additional description will be omitted to avoid redundancy.

In operation S320, the storage device 2200 may determine the internal throttling level THLV_int based on the internal policy 2217. For example, as described with reference to FIG. 11, the throttling manager 2212 of the storage device 2200 may determine the internal throttling level THLV_int based on the internal policy 2217 and the state of the storage device 2200.

In operation S330, the storage device 2200 may compare the internal throttling level THLV_int and the external throttling level THLV_ext. When the external throttling level THLV_ext and the internal throttling level THLV_int are identical, in operation S340, the storage device 2200 may determine the external throttling level THLV_ext or the internal throttling level THLV_int as the final throttling level THLV_fin.

When the external throttling level THLV_ext and the internal throttling level THLV_int are different, in operation S350, the storage device 2200 may determine the final throttling level THLV_fin based on a given condition. For example, the throttling manager 2212 may determine whether indexes associated with the external throttling level THLV_ext satisfy indexes associated with the internal throttling level THLV_int.

In some examples, the external throttling level THLV_ext may be higher than the internal throttling level THLV_int. That is, the host 2100 may have a priority for a performance consistency above a throttling performance. In this case, when a fluctuation level of the internal throttling level THLV_int satisfies a fluctuation level of the external throttling level THLV_ext and a throttling performance of the internal throttling level THLV_int is higher than a throttling performance of the external throttling level THLV_ext, the throttling manager 2212 may determine the internal throttling level THLV_int as the final throttling level THLV_fin. Alternatively, when the fluctuation level of the internal throttling level THLV_int does not satisfy the fluctuation level of the external throttling level THLV_ext, the throttling manager 2212 may determine the external throttling level THLV_ext as the final throttling level THLV_fin. That is, the throttling manager 2212 may select the final throttling level THLV_fin such that there is satisfied a particular condition of the external throttling level THLV_ext selected by the host 2100.

However, the inventive concept is not limited thereto. For example, the storage device 2200 according to an embodiment of the inventive concept may determine the final throttling level THLV_fin through various manners or various conditions. For example, the host 2100 may provide information about the external throttling level THLV_ext and a priority to the storage device 2200, and the storage device 2200 may determine the final throttling level THLV_fin such that indexes associated with a priority from among indexes of the external throttling level THLV_ext are preferentially satisfied.

Afterwards, the storage device 2200 may perform operation S360 and operation S370. Operation S360 and operation S370 may be similar to operation S170 and operation S180 of FIG. 6, operation S213 and operation S214 of FIG. 8, or operation S223 and operation S224 of FIG. 8 except that the final throttling level THLV_fin is used, and thus, additional description will be omitted to avoid redundancy.

Figure 13A:
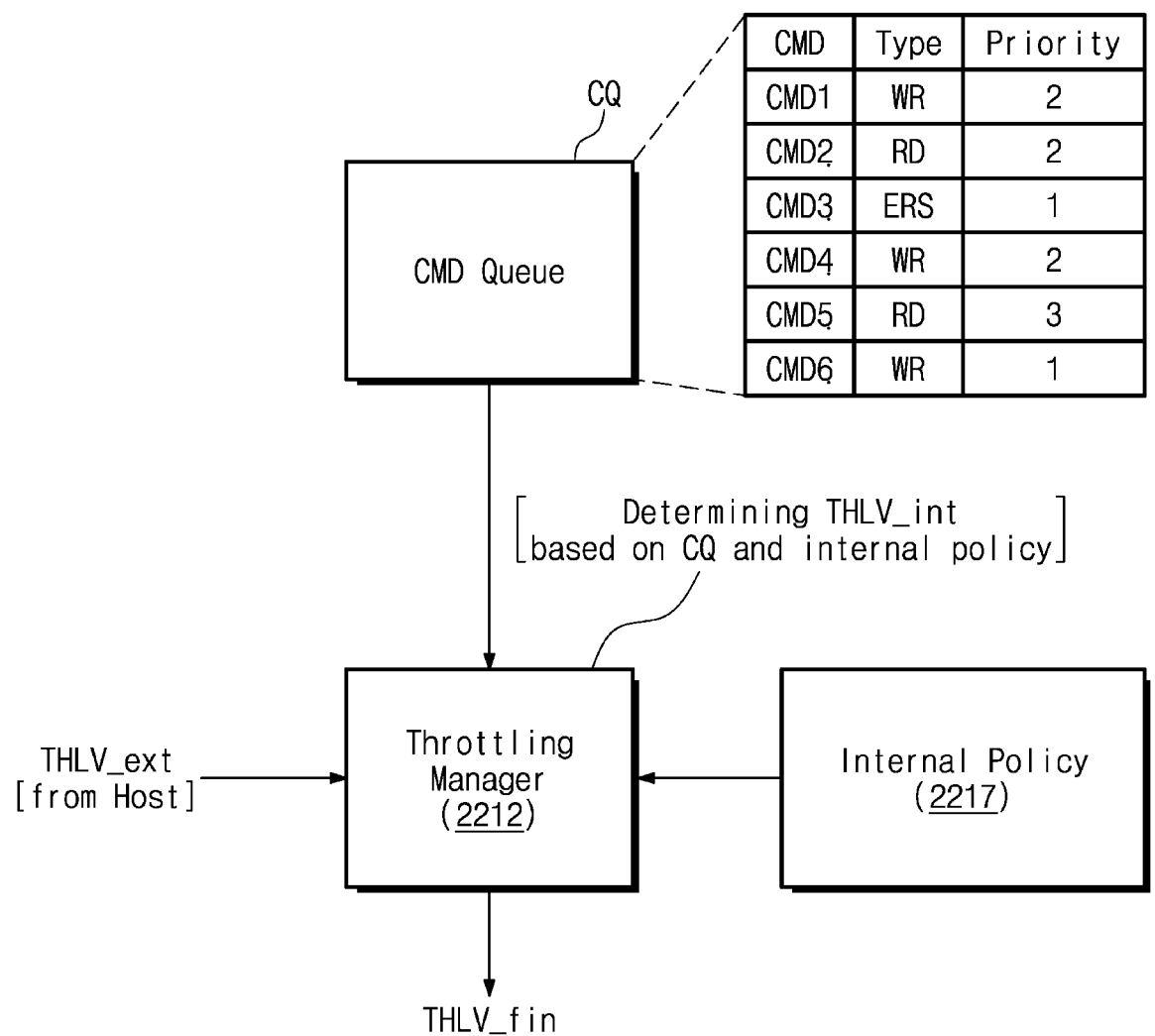
FIGS. 13A to 13C are diagrams for describing operations of selecting an internal throttling level based on an internal policy of a storage device of FIG. 10 according to example embodiments.
Figure 13B:
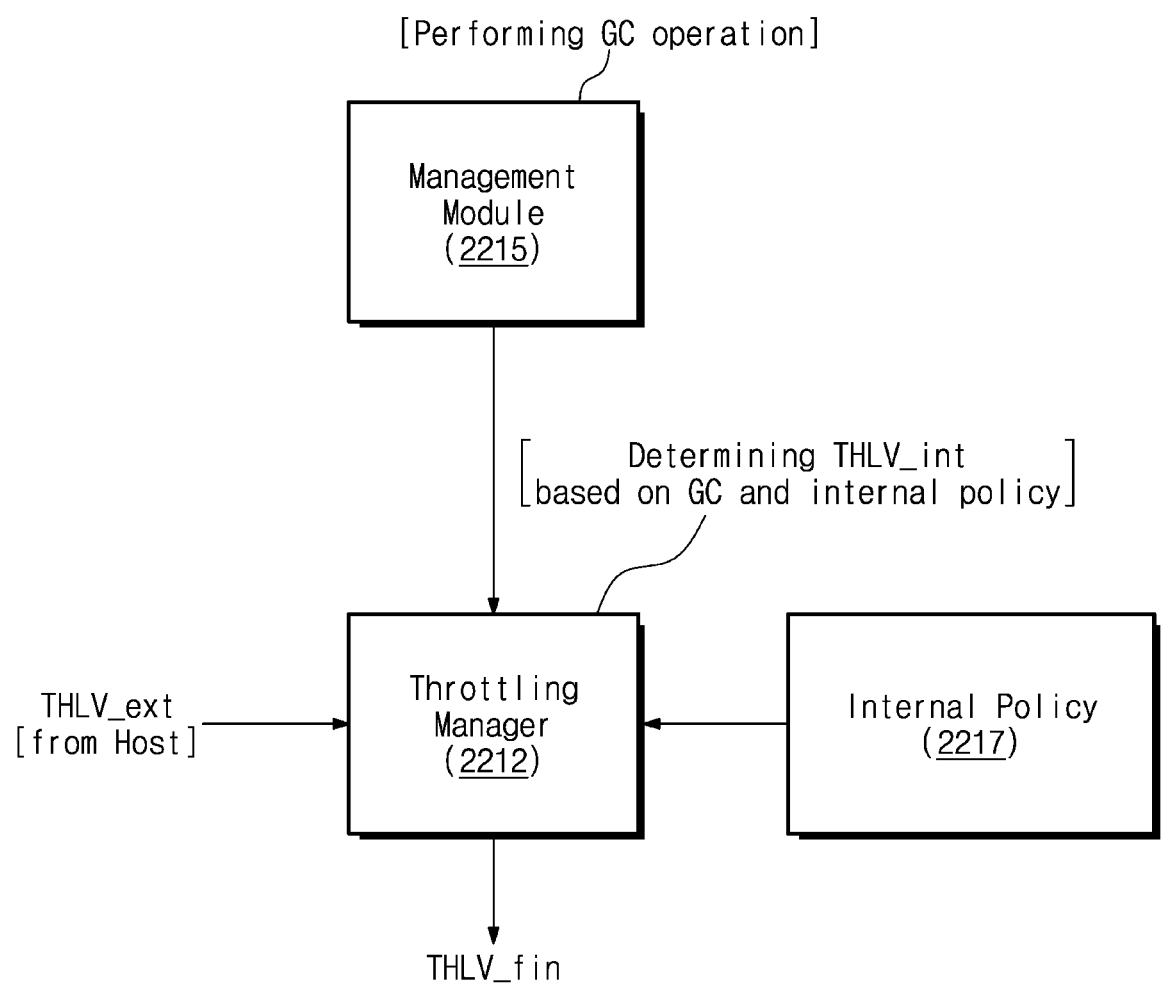
Figure 13C:
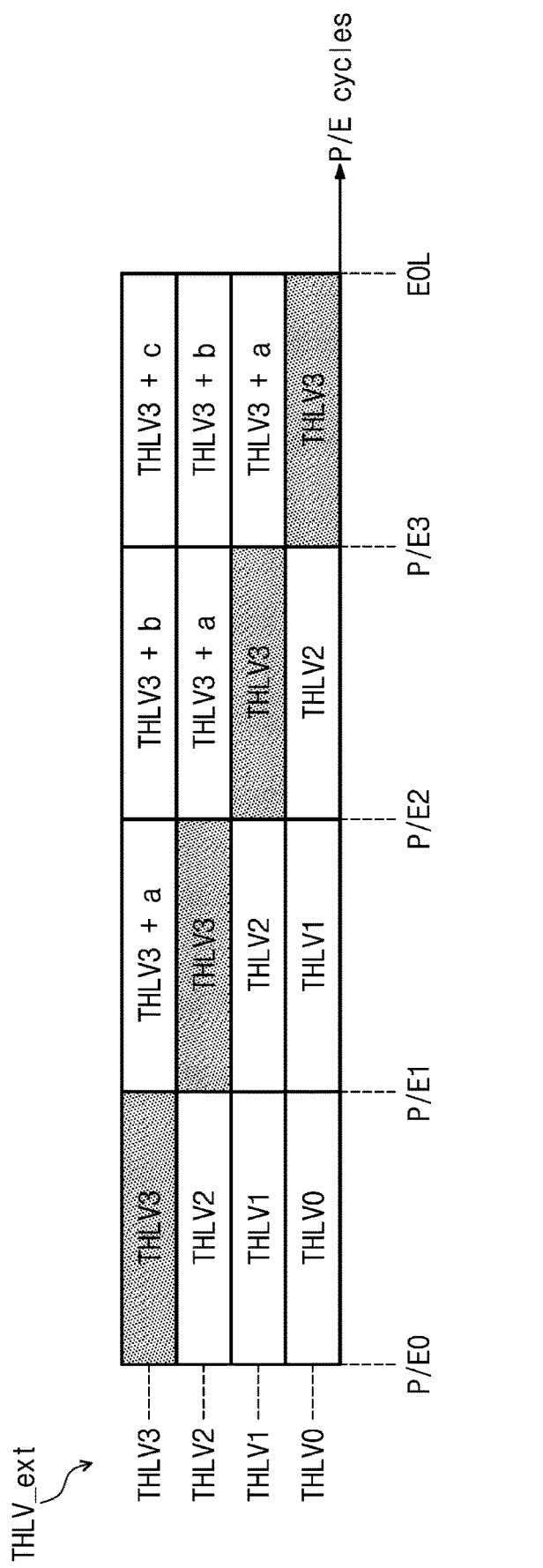

FIGS. 13A to 13C are diagrams for describing operations of selecting an internal throttling level based on the internal policy of the storage device of FIG. 10. For convenience of description, components that are unnecessary to describe operations of selecting an internal throttling level based on an internal policy of the storage device 2200 will be omitted, and additional description associated with the above-described components will be omitted. In FIG. 13C, a horizontal axis represents the number of program/erase (P/E) cycles of the nonvolatile memory device 2220.

Referring to FIGS. 10 and 13A, the controller 2210 of the storage device 2200 may include the throttling manager 2212, the internal policy 2217, and a command (CMD) queue CQ. The command queue CQ may include information about commands to be performed at the storage device 2200 or about pending commands.

The throttling manager 2212 may select the internal throttling level THLV_int based on the internal policy 2217 and the command queue CQ. For example, the command queue CQ may include information about types and priorities of first to sixth commands CMD1 to CMD6. The throttling manager 2212 may determine a state of the storage device 2200 based on the command queue CQ.

In some examples, the throttling manager 2212 may determine the state of the storage device 2200 based on the number of write commands of the plurality of commands CMD1 to CMD6 included in the command queue CQ or a ratio of write commands of the plurality of commands CMD1 to CMD6. Alternatively, the throttling manager 2212 may select commands having a particular priority from among the plurality of commands CMD1 to CMD6 and may determine the state of the storage device 2200 based on the number of write commands of the selected commands. Alternatively, the throttling manager 2212 may determine the state of the storage device 2200 based on a command depth of the command queue CQ.

The above examples are for describing embodiments of the inventive concept easily, and the inventive concept is not limited thereto. For example, the throttling manager 2212 may determine the state of the storage device 2200 based on various information of the command queue CQ. Afterwards, the throttling manager 2212 may determine the final throttling level THLV_fin based on the external throttling level THLV_ext and the internal throttling level THLV_int.

Referring to FIGS. 10 and 13B, the controller 2210 of the storage device 2200 may include the throttling manager 2212, the internal policy 2217, and a management module 2215. As described with reference to FIG. 3, the management module 2215 may perform various management operations (e.g., a garbage collection (GC) operation, a wear-leveling operation, and a bad block replacing operation) for using the storage device 2200 efficiently.

In an example embodiment, in the case where a management operation is performed by the management module 2215, because operations associated with the nonvolatile memory device 2220 are performed, the performance of the storage device 2200 may be reduced, or a fluctuation level may increase. For example, in the case where the management module 2215 performs the garbage collection (GC) operation, the nonvolatile memory device 2220 may repeatedly perform a read operation and a write operation. This case may be recognized by the host 2100 as the performance of the storage device 2200 is reduced or a fluctuation level increases. To decrease the fluctuation level, the throttling manager 2212 may select a relatively high throttling level as the internal throttling level THLV_int.

For example, the throttling manager 2212 may determine the state of the storage device 2200 based on various management operations performed by the management module 2215 and may select the internal throttling level THLV_int based on the determined state. The throttling manager 2212 may determine the final throttling level THLV_fin based on the external throttling level THLV_ext and the internal throttling level THLV_int.

Referring to FIGS. 10 and 13C, the nonvolatile memory device 2220 of the storage device 2200 may have a lifetime based on the number of P/E cycles. In an example embodiment, as the number of P/E cycles of the nonvolatile memory device 2220 increases, various internal operations may be repeatedly performed. This may cause the reduction of average performance of the storage device 2200 or an increase of a fluctuation level. In this case, the storage device 2200 may vary the external throttling level THLV_ext depending on the number of P/E cycles of the nonvolatile memory device 2220.

For example, it is assumed that the external throttling level THLV_ext that is provided from the host 2100 is one of 0-th to third external throttling levels THLV0_ext to THLV3_ext. In this case, the third external throttling level THLV3_ext may be higher than the second external throttling level THLV2_ext, the second external throttling level THLV2_ext may be higher than the first external throttling level THLV1_ext, and the first external throttling level THLV1_ext may be higher than the 0-th external throttling level THLV0_ext.

As described above, as the number of P/E cycles of the nonvolatile memory device 2220 increases, a fluctuation level of the storage device 2200 may increase. In this case, to compensate for an increase of the fluctuation level according to the number of P/E cycles, it may be necessary to use a throttling level higher than the external throttling level THLV_ext.

In an example embodiment, in an interval usage period (i.e., P/E0 to P/E1) of the storage device 2200, the third external throttling level THLV3_ext may be determined as a third throttling level THLV3, the second external throttling level THLV2_ext may be determined as a second throttling level THLV2, the first external throttling level THLV1_ext may be determined as a first throttling level THLV1, and the 0-th external throttling level THLV0_ext may be determined as a 0-th throttling level THLV0.

Afterwards, in a next period (i.e., P/E1 to P/E2) in which the number of P/E cycles increases, the third external throttling level THLV3_ext may be determined as a (3+a)-th throttling level THLV3+a, the second external throttling level THLV2_ext may be determined as the third throttling level THLV3, the first external throttling level THLV1_ext may be determined as the second throttling level THLV2, and the 0-th external throttling level THLV0_ext may be determined as the first the throttling level THLV1. In an example embodiment, the (3+a)-th throttling level THLV3+a may be higher than the third throttling level THLV3.

In the following periods P/E2 to P/E3 and P/E3 to EOL, the plurality of external throttling levels THLV3_ext to THLV0_ext may be respectively determined as a plurality of throttling levels THLV3+c, THLV3+b, THLV3+a, THLV3, THLV2 etc. That is, as the number of P/E cycles increases, a higher throttling level may be determined with respect to the same external throttling level.

As described above, a storage device according to an embodiment of the inventive concept may support a throttling operation that is based on a plurality of throttling levels. Accordingly, a throttling level may be selected depending on an explicit request of a host, and a storage device may provide an optimum performance to the host depending on the selected throttling level.

Figure 14:
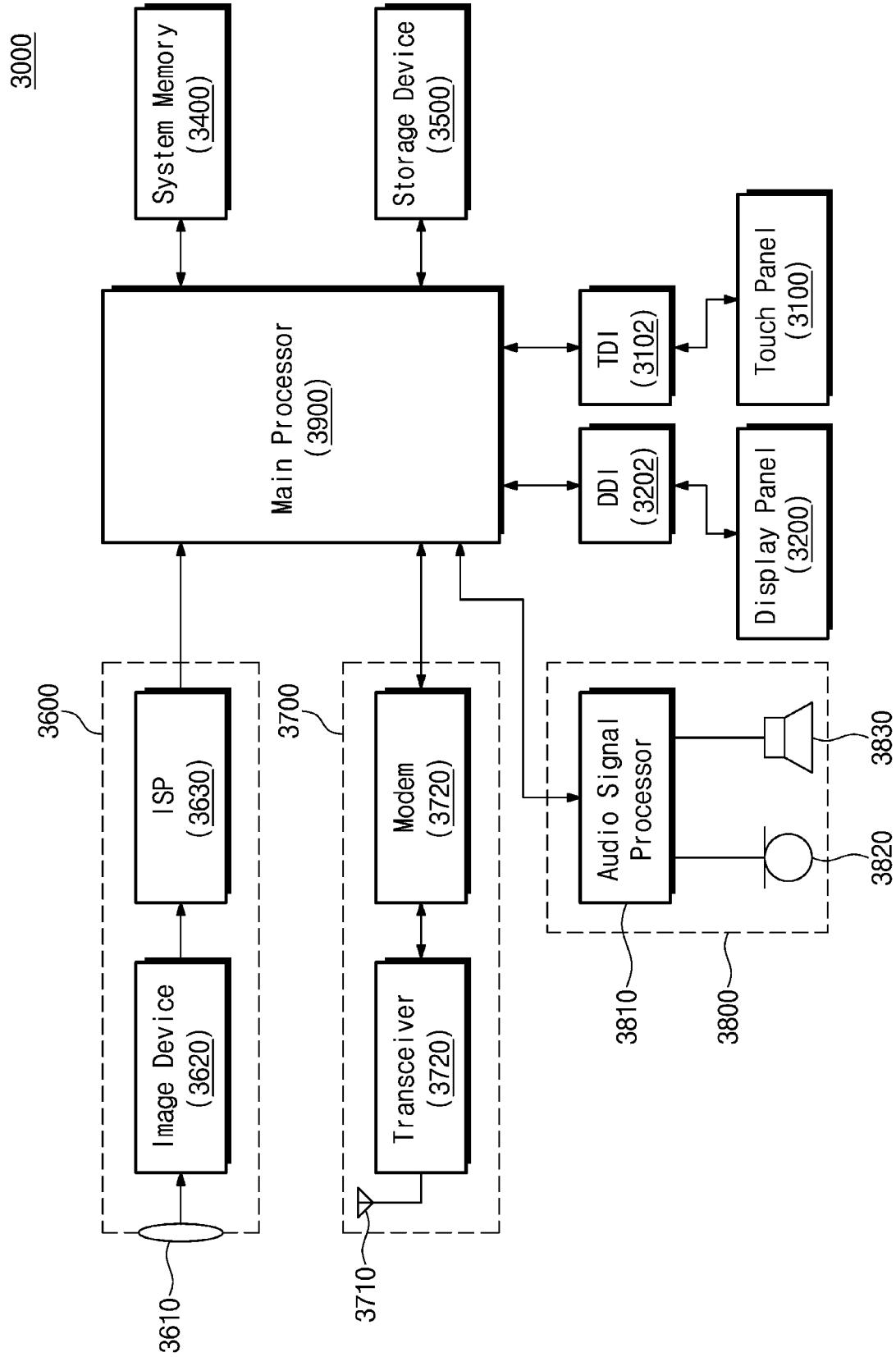
FIG. 14 is a block diagram illustrating an electronic device to which a storage system according to the inventive concept is applied.

FIG. 14 is a block diagram illustrating an electronic device to which a storage system according to the inventive concept is applied. Referring to FIG. 14, an electronic device 3000 may include a touch panel 3100, a touch driver integrated circuit 3102, a display panel 3200, a display driver integrated circuit 3202, a system memory 3400, a storage device 3500, an image processor 3600, a communication block 3700, an audio processor 3800, and a main processor 3900. In an example embodiment, the electronic device 3000 may be one of various electronic devices such as a portable communication terminal, a personal digital assistant (PDA), a portable media player (PMP), a digital camera, a smartphone, a tablet computer, a laptop computer, and a wearable device.

The touch driver integrated circuit 3102 may be configured to control the touch panel 3100. The touch panel 3100 may be configured to sense a touch input from a user under control of the touch driver integrated circuit 3102. The display driver integrated circuit 3202 may be configured to control the display panel 3200. The display panel 3200 may be configured to display image information under control of the display driver integrated circuit 3202.

The system memory 3400 may store data that are used for an operation of the electronic device 3000. For example, the system memory 3400 may temporarily store data processed or to be processed by the main processor 3900. For example, the system memory 3400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage device 3500 may store data regardless of whether a power is supplied. For example, the storage device 3500 may include at least one of various nonvolatile memories such as a flash memory, a PRAM, an MRAM, a ReRAM, and a FRAM. For example, the storage device 3500 may include an embedded memory and/or a removable memory of the electronic device 3000. In an example embodiment, the storage device 3500 may be the storage device 1200 or 2200 described with reference to FIGS. 1 to 4, 5A, 5B, 6, 7A to 7D, 8 to 12, and 13A to 13C or may operate based on the operation method described with reference to FIGS. 1 to 4, 5A, 5B, 6, 7A to 7D, 8 to 12, and 13A to 13C.

The image processor 3600 may receive a light through a lens 3610. An image device 3620 and an image signal processor 3630 included in the image processor 3600 may generate image information about an external object, based on a received light.

The communication block 3700 may exchange signals with an external device/system through an antenna 3710. A transceiver 3720 and a modulator/demodulator (MODEM) 2730 of the communication block 3700 may process signals exchanged with the external device/system in compliance with at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID).

The audio processor 3800 may process an audio signal by using an audio signal processor 3810. The audio processor 3800 may receive an audio input through a microphone 3820 or may provide an audio output through a speaker 3830.

The main processor 3900 may control overall operations of the electronic device 3000. The main processor 3900 may control/manage operations of the components of the electronic device 3000. The main processor 3900 may process various operations for the purpose of operating the electronic device 3000. In an example embodiment, a part of the components of FIG. 14 may be implemented in the form of a system on chip and may be provided as an application processor (AP) of the electronic device 3000. In an example embodiment, the main processor 3900 may be the host 1100 or 2100 described with reference to FIGS. 1 to 4, 5A, 5B, 6, 7A to 7D, 8 to 12, and 13A to 13C or may operate based on the operation method described with reference to FIGS. 1 to 4, 5A, 5B, 6, 7A to 7D, 8 to 12, and 13A to 13C.

Figure 15:
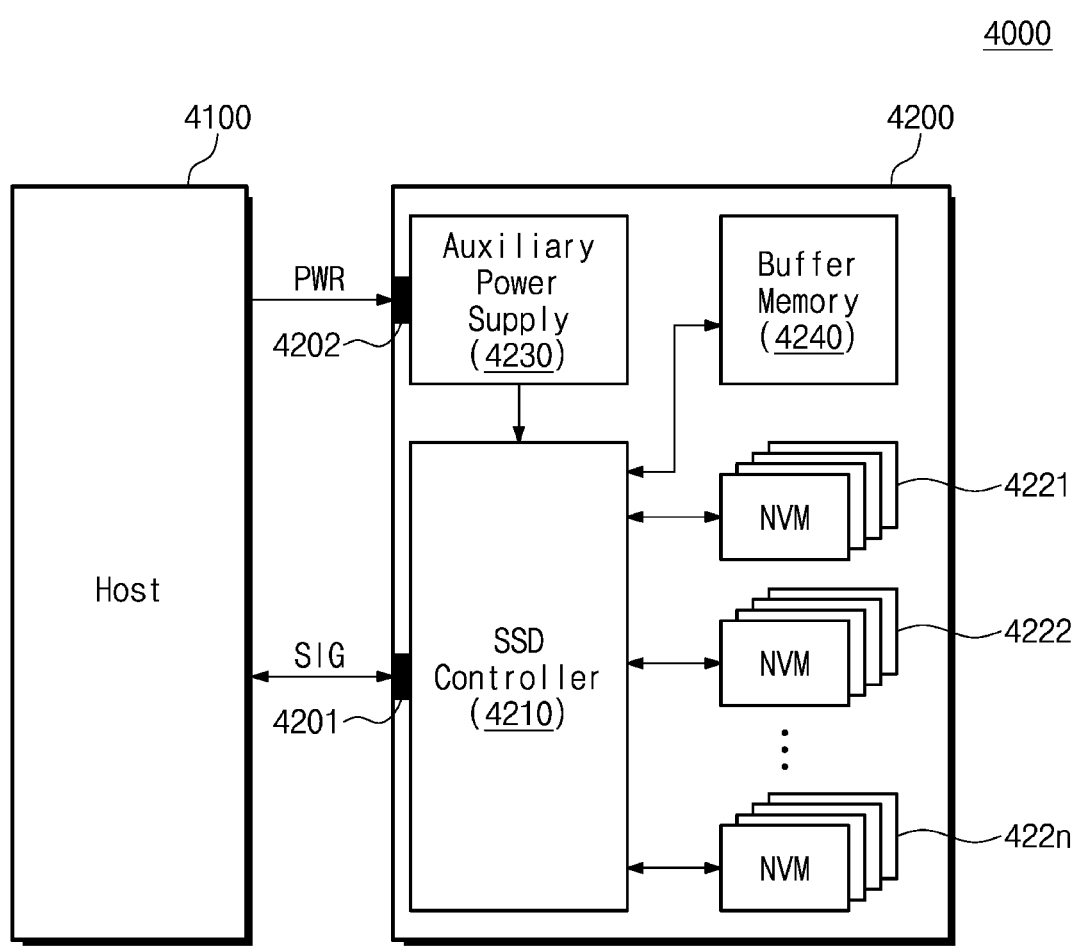
FIG. 15 is a block diagram illustrating an SSD system to which a storage system according to the inventive concept is applied.

FIG. 15 is a block diagram illustrating an SSD system to which a storage system according to the inventive concept is applied. Referring to FIG. 15, a storage system 4000 may include a host 4100 and a storage device 4200. In an example embodiment, the host 4100 and the storage device 4200 may be the host 1100 or 2100 and the storage device 1200 or 2200 described with reference to FIGS. 1 to 4, 5A, 5B, 6, 7A to 7D, 8 to 12, and 13A to 13C or may operate based on the operation method described with reference to FIGS. 1 to 4, 5A, 5B, 6, 7A to 7D, 8 to 12, and 13A to 13C.

The storage device 4200 exchanges a signal SIG with the host 4100 through a signal connector 4201 and is supplied with a power PWR through a power connector 4202. The storage device 4200 includes a solid state drive (SSD) controller 4210, a plurality of nonvolatile memories 4221 to 422n, an auxiliary power supply 4230, and a buffer memory 4240.

The SSD controller 4210 may control the nonvolatile memories 4221 to 422n in response to the signal SIG received from the host 4100. The nonvolatile memories 4221 to 422n may operate under control of the SSD controller 4210. The auxiliary power supply 4230 is connected with the host 4100 through the power connector 4202. The auxiliary power supply 4230 may be charged by the power PWR supplied from the host 4100. When the power PWR is not smoothly supplied from the host 4100, the auxiliary power supply 4230 may power the storage device 4200.

The buffer memory 4240 may be used as a buffer memory. In an example embodiment, the storage device 4200 may perform the above throttling operation by controlling operation parameters associated with the buffer memory, but the inventive concept is not limited thereto.

Figure 16:
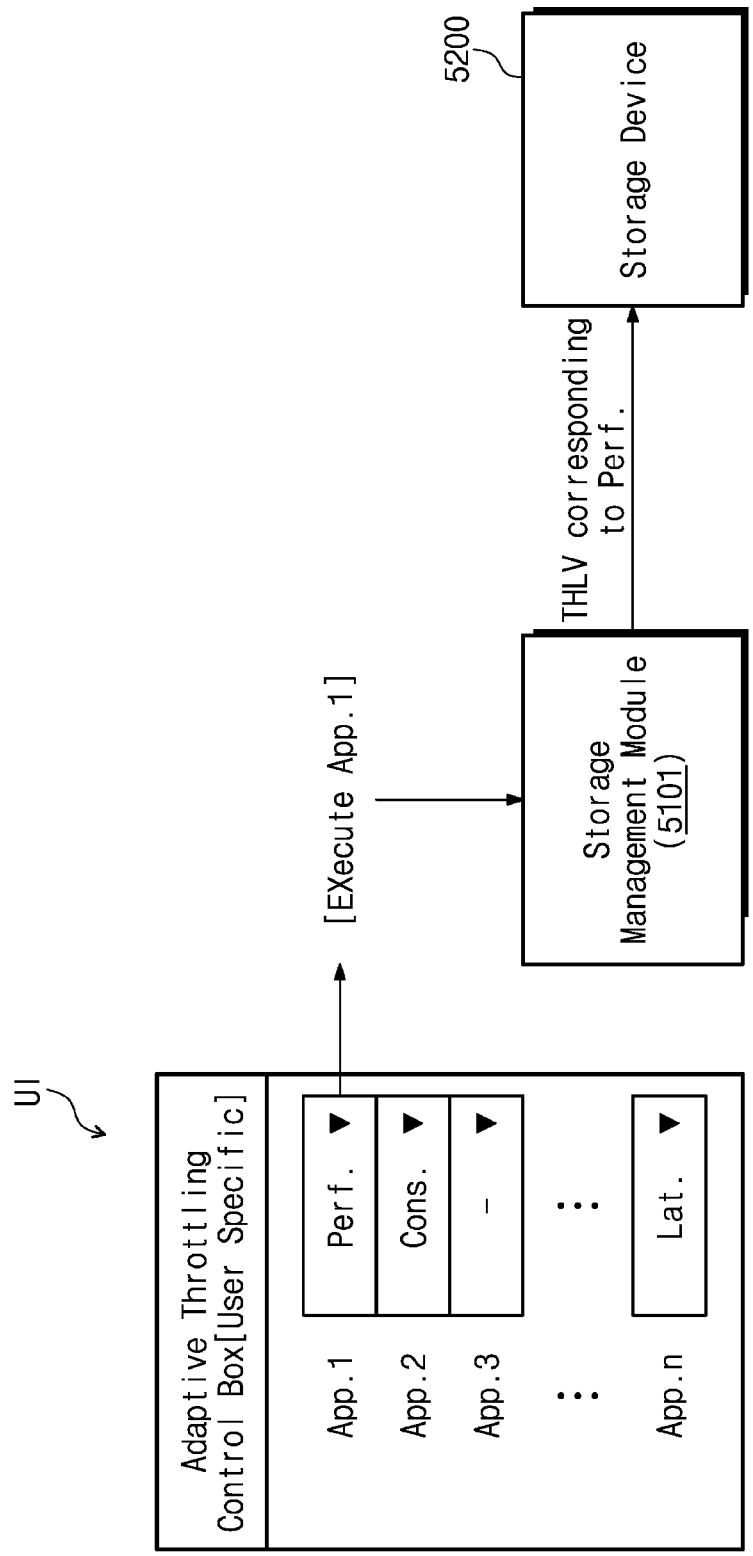
FIG. 16 is a block diagram illustrating a user interface that is applied to a storage system according to the inventive concept.

FIG. 16 is a block diagram illustrating a user interface that is applied to a storage system according to the inventive concept. Referring to FIG. 16, a user interface UI of a storage system 5000 may display an adaptive throttling control box. The adaptive throttling control box may be configured to set a priority for each of various applications depending on a user specific. For example, a user may set a priority of a first application APP1 to a performance Perf. in the adaptive throttling control box of the user interface UI. In this case, when the first application APP1 is executed, a storage management module 5101 may determine a throttling level corresponding to the priority of performance (i.e., Perf) selected by the user and may provide the determined throttling level THLV to a storage device 5200 The storage device 5200 may perform an adaptive throttling operation based on one of the above embodiments or a combination of at least two of the above embodiments.

According to an embodiment of the inventive concept, a storage device may perform an adaptive throttling operation or a dynamic throttling operation based on a plurality of throttling levels, depending on an explicit request of a host device. The storage device may provide an optimized performance to the host device, and thus, an operation method of the storage device with improved performance, and an operation method of a storage system including the host device and the storage device are provided.

While the inventive concept has been described with reference to example embodiments thereof, it will be apparent to those of ordinary skill in the art that various changes and modifications may be made thereto without departing from the spirit and scope of the inventive concept as set forth in the following claims.

What is claimed is:

1. An operation method of a storage device configured to communicate with an external device through an interface channel, the method comprising:

receiving an indicator of a first throttling level of a plurality of throttling levels from the external device;

setting a first operation parameter based on a throttling predefined table (PDT) including a relationship between the plurality of throttling levels and a plurality of throttling performances, such that the interface channel has a first throttling performance from among the plurality of throttling performances, the first throttling performance corresponding to the first throttling level;

receiving a first input/output (I/O) request from the external device through the interface channel having the first throttling performance caused by the setting of the first operation parameter;

processing a first operation corresponding to the first I/O request through the interface channel having the first throttling performance;

receiving the first operation parameter based on the throttling PDT such that the interface channel has a second throttling performance corresponding to the second throttling level;

receiving a second I/O request from the external device through the interface channel having the second throttling performance caused by the re-setting of the first parameter; and processing a second operation corresponding to the second I/O request through the interface channel having the second throttling performance.

2. The method of claim 1, further comprising:
receiving a request for the throttling PDT from the external device; and
transferring the throttling PDT to the external device in response to the request.

3. The method of claim 1, wherein a first average performance and a first minimum performance of the interface channel having the first throttling performance are different from a second average performance and a second minimum performance of the interface channel having the second throttling performance.

4. The method of claim 1, wherein a first fluctuation level being a difference between a first maximum performance and a first minimum performance of the interface channel having the first throttling performance is different from a second fluctuation level being a difference between a second maximum performance and a second minimum performance of the interface channel having the second throttling performance.

5. The method of claim 1, wherein a first fluctuation level being a difference between a first maximum performance and a first minimum performance of the interface channel having the first throttling performance is greater than a second fluctuation level being a difference between a second maximum performance and a second minimum performance of the interface channel having the second throttling performance, and
wherein a first average performance and the first maximum performance of the interface channel having the first throttling performance are greater than a second average performance and the second maximum performance of the interface channel having the second throttling performance, respectively.

6. The method of claim 1, wherein the first throttling performance is associated with at least one of a random read speed, a random write speed, a sequential read speed, and a sequential write speed through the interface channel.

7. The method of claim 1, wherein the storage device includes a host interface circuit configured to communicate with the external device through the interface channel, and
wherein the first operation parameter includes information for controlling an operation of the host interface circuit.

8. The method of claim 1, further comprising:
before receiving the indicator of the first throttling level, receiving a 0-th I/O request from the external device through the interface channel having a normal performance and processing a 0-th operation corresponding to the 0-th I/O request,
wherein a 0-th average performance of the interface channel having the normal performance is higher than a first average performance having the first throttling performance, and
wherein a 0-th fluctuation level being a difference of a 0-th maximum performance and a 0-th minimum performance of the interface channel having the normal performance is greater than a first fluctuation level being a difference of a first maximum performance and a first minimum performance of the interface channel having the first throttling performance.

9. An operation method of a storage device configured to communicate with an external device through an interface channel, the method comprising:
receiving an indicator of an external throttling level from the external device;
determining an internal throttling level from among a plurality of internal throttling levels, the internal throttling level corresponding to a current state of the storage device, based on an internal policy including a relationship between a plurality of states of the storage device and the plurality of internal throttling levels;
determining a final throttling level based on the external throttling level and the internal throttling level;
setting an operation parameter based on a throttling predefined table (PDT) including a relationship between a plurality of throttling levels and a plurality of throttling performances, such that the interface channel has a throttling performance from among the plurality of throttling performances, the throttling performance corresponding to the final throttling level;
receiving a first input/output (I/O) request from the external device through the interface channel having the throttling performance caused by the setting of the operation parameter; and
processing a first operation corresponding to the first I/O request through the interface channel having the throttling performance,
wherein the plurality of throttling levels include the external throttling level and the plurality of internal throttling levels.

10. The method of claim 9, wherein the current state of the storage device is determined based on a plurality of commands pending in a command queue.

11. The method of claim 9, further comprising:
performing a management operation including a garbage collection (GC) operation, a wear-leveling operation, or a bad block replacing operation by a management module of the storage device,
wherein the current state of the storage device is determined based on the performing of the management operation.

12. The method of claim 9, wherein the determining of the final throttling level includes:
comparing the external throttling level and the internal throttling level;
determining the external throttling level or the internal throttling level as the final throttling level when the external throttling level and the internal throttling level are identical; and
determining one of the external throttling level, the internal throttling level, and a different throttling level as the final throttling level when the external throttling level and the internal throttling level are different from each other.

13. The method of claim 9, wherein the throttling performance is associated with at least one of a random read speed, a random write speed, a sequential read speed, or a sequential write speed through the interface channel.

14. The method of claim 9, further comprising:
receiving a request for the throttling PDT from the external device; and
transferring the throttling PDT to the external device in response to the request.

15. The method of claim 9, wherein the storage device includes a host interface circuit configured to communicate with the external device through the interface channel, and wherein the operation parameter includes information for controlling an operation of the host interface circuit.

16. An operation method of a storage system including a host device and a storage device communicating with the host device through an interface channel, the method comprising:

executing, by the host device, a first application having a first priority;

selecting, by the host device, a first throttling level corresponding to the first priority based on a throttling predefined table (PDT);

transferring, by the host device, an indicator of the first throttling level to the storage device;

setting, by the storage device, a first operation parameter based on the throttling PDT such that the interface channel has a first throttling performance corresponding to the first throttling level;

transferring, by the host device, a first input/output (I/O) request generated by the first application to the storage device through the interface channel having the first throttling performance caused by the setting of the first operation parameter; and processing, by the storage device, a first operation corresponding to the first I/O request through the interface channel having the first throttling performance.

17. The method of claim 16, further comprising:

executing, by the host device, a second application having a second priority;

selecting, by the host device, a second throttling level corresponding to the second priority based on the throttling PDT;

transferring, by the host device, an indicator of the second throttling level to the storage device;

re-setting, by the storage device, the first operation parameter based on the throttling PDT such that the interface channel has a second throttling performance corresponding to the second throttling level;

transferring, by the host device, a second I/O request generated by the second application to the storage device through the interface channel having the second throttling performance caused by the re-setting of the first operation parameter; and processing, by the storage device, a second operation corresponding to the second I/O request through the interface channel having the second throttling performance.

18. The method of claim 17, wherein the first priority is associated with a performance, and the second priority is associated with a performance consistency, wherein a second fluctuation level being a difference between a second maximum performance and a second minimum performance of the interface channel having the second throttling performance is smaller than a first fluctuation level being a difference between a first maximum performance and a first minimum performance of the interface channel having the first throttling performance; and wherein a first average performance of the interface channel having the first throttling performance is higher than a second average performance of the interface channel having the second throttling performance.

19. The method of claim 16, wherein the storage device includes a host interface circuit configured to communicate with the host device through the interface channel, and wherein the first operation parameter includes information for controlling an operation of the host interface circuit.

* * * * *